United States Patent
Tameshige et al.

(10) Patent No.: US 8,874,952 B2
(45) Date of Patent: Oct. 28, 2014

(54) COMPUTER SYSTEM AND AVAILABILITY METHOD THEREOF

(75) Inventors: Takashi Tameshige, Tokyo (JP); Yoshifumi Takamoto, Kokubunji (JP); Keisuke Hatasaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 285 days.

(21) Appl. No.: 13/388,948

(22) PCT Filed: Mar. 5, 2010

(86) PCT No.: PCT/JP2010/001535
§ 371 (c)(1), (2), (4) Date: Feb. 3, 2012

(87) PCT Pub. No.: WO2011/083522
PCT Pub. Date: Jul. 14, 2011

(65) Prior Publication Data
US 2012/0131379 A1    May 24, 2012

(30) Foreign Application Priority Data

Jan. 5, 2010 (JP) ................. 2010-000609

(51) Int. Cl.
*G06F 11/00* (2006.01)
*G06F 9/50* (2006.01)

(52) U.S. Cl.
CPC ................................ *G06F 9/5077* (2013.01)
USPC ......................................................... 714/4.1

(58) Field of Classification Search
CPC ... G06F 11/20; G06F 11/202; G06F 11/2025; G06F 11/2028; G06F 11/2033; G06F 11/2038; G06F 11/2041; G06F 11/2046
See application file for complete search history.

(56) References Cited

U.S. PATENT DOCUMENTS

| | | | |
|---|---|---|---|
| 7,802,127 B2 * | 9/2010 | Katano et al. ...................... 714/3 |
| 7,953,831 B2 * | 5/2011 | Tanabe et al. ................. 709/221 |
| 2005/0192969 A1 | 9/2005 | Haga et al. |
| 2007/0174658 A1 * | 7/2007 | Takamoto et al. ................. 714/4 |
| 2008/0162800 A1 | 7/2008 | Takashige et al. |
| 2009/0125667 A1 * | 5/2009 | Hatasaki et al. ................... 711/6 |
| 2009/0150528 A1 * | 6/2009 | Tanabe et al. ................. 709/221 |
| 2009/0172142 A1 * | 7/2009 | Hanai et al. ................... 709/223 |
| 2010/0050011 A1 * | 2/2010 | Takamoto et al. ................. 714/4 |
| 2010/0293409 A1 * | 11/2010 | Machida ........................... 714/4 |

FOREIGN PATENT DOCUMENTS

| JP | 2005-216151 A | 8/2005 |
|---|---|---|
| JP | 2008-146566 A | 6/2008 |
| JP | 4295783 | 4/2009 |

OTHER PUBLICATIONS

PCT International Search Report and Written Opinion on application No. PCT/JP2010/001535 mailed Jun. 8, 2010; 10 pages.

* cited by examiner

*Primary Examiner* — Charles Ehne
(74) *Attorney, Agent, or Firm* — Foley & Lardner LLP

(57) ABSTRACT

High availability computer system and fault correction method. If a fault occurs in the current-system physical device allocated to the current-system virtual device of the virtual server, the virtualization mechanism of the physical server configures, for the standby-system virtual device of the virtual server, the standby-system physical device, as a physical device which is used at a high priority, and the virtualization mechanism distributes the request issued from the standby-system virtual device of another virtual server to a standby-system physical device, but, when such a standby-system physical device does not exist, the virtualization mechanism distributes the request to a standby-system physical device configured for high priority usage.

16 Claims, 18 Drawing Sheets

FIG.7

| 73A | 73B | 73C | | | 73D | 73E | 73F | 73G |
|---|---|---|---|---|---|---|---|---|
| PHYSICAL SERVER IDENTIFIER | UUID | PHYSICAL ADAPTER | | | SWITCH INFORMATION | SERVER MODEL | CONFIGU-RATION | PERFORMANCE INFORMATION |
| | | DEVICE | WWN | STATUS | | | | |
| PHYSICAL SERVER 1 | UUID1 | HBA1 | WWN1 | NORMAL | FCSW1,port1,SAN Security | COMPANY A SERVER MODEL 1 | IA32 | CPU:3GHz/core:4 memory:4GB HDD(SAS):120GB NIC:1Gbps,HBA:3Gbps |
| | | HBA2 | WWN2 | NORMAL | FCSW2,port1,SAN Security | | | |
| | | NIC1 | MAC1 | "FAULT" | NWSW1,port1,PORT VLAN | | | |
| | | NIC2 | MAC2 | NORMAL | NWSW1,port2,TAG VLAN | | | |
| PHYSICAL SERVER 2 | UUID2 | HBA3 | WWN3 | NORMAL | FCSW1,port2,SAN Security | COMPANY A SERVER MODEL 1 | IA32 | CPU:3GHz/core:4 memory:4GB HDD(SAS):120GB NIC:1Gbps,HBA:3Gbps |
| | | HBA4 | WWN4 | NORMAL | FCSW2,port2,SAN Security | | | |
| | | NIC3 | MAC3 | NORMAL | NWSW1,port3,PORT VLAN | | | |
| | | NIC4 | MAC4 | NORMAL | NWSW1,port4,TAG VLAN | | | |
| PHYSICAL SERVER 3 | UUID3 | HBA5 | WWN5 | NORMAL | FCSW1,port3,SAN Security | COMPANY A BLADE SERVER MODEL 2 | Chassis1 Slot1 SMP:No IA32 | CPU:2GHz/core:2 memory:4GB NIC:1Gbps,HBA:3Gbps |
| | | HBA5 | MAC5 | NORMAL | NWSW1,port5,PORT VLAN | | | |
| | | NIC6 | MAC6 | NORMAL | NWSW1,port10,TAG VLAN | | | |
| | | NIC7 | MAC7 | NORMAL | NWSW2,port1,TAG VLAN | | | |
| PHYSICAL SERVER 4 | UUID4 | HBA6 | WWN6 | NORMAL | FCSW2,port3,PORT VLAN | COMPANY A SERVER MODEL 2 | Chassis2 Slot1 SMP:No IA32 | CPU:2GHz/core:2 memory:4GB NIC:1Gbps,HBA:3Gbps |
| | | NIC8 | MAC3 | NORMAL | NWSW1,port11,TAG VLAN | | | |
| | | NIC9 | MAC9 | NORMAL | NWSW2,port2,TAG VLAN | | | |
| | | NIC10 | MAC10 | NORMAL | NWSW2,port2,TAG VLAN | | | |
| PHYSICAL SERVER 5 | UUID5 | HBA7 | WWN7 | NORMAL | FCSW1,port4,SAN Security | COMPANY B SERVER MODEL 3 | IA32 | CPU:1.6GHz/core:4 memory:4GB HDD(SAS):80GB NIC:1Gbps,HBA:3Gbps |
| | | NIC11 | MAC11 | NORMAL | NWSW1,port7,PORT VLAN | | | |
| | | NIC12 | MAC12 | NORMAL | NWSW1,port12,TAG VLAN | | | |
| | | NIC13 | MAC13 | NORMAL | NWSW2,port3,TAG VLAN | | | |
| PHYSICAL SERVER 6 | UUID6 | HBA8 | WWN8 | NORMAL | FCSW1,port5,SAN Security | COMPANY B SERVER MODEL 4 | Chassis4 Slot1 HA:Yes IA32 | CPU:1.6GHz/core:4 memory:4GB HDD(SAS):80GB NIC:1Gbps,HBA:3Gbps |
| | | NIC14 | MAC14 | NORMAL | NWSW1,port8,PORT VLAN | | | |
| | | NIC15 | MAC15 | NORMAL | NWSW1,port13,TAG VLAN | | | |
| | | NIC16 | MAC16 | NORMAL | NWSW2,port4,TAG VLAN | | | |
| PHYSICAL SERVER 7 | UUID7 | HBA9 | WWN9 | NORMAL | FCSW1,port6,SAN Security | COMPANY B SERVER MODEL 4 | Chassis4 Slot2 HA:Yes IA32 | CPU:1.6GHz/core:4 memory:4GB HDD(SAS):80GB NIC:1Gbps,HBA:3Gbps |
| | | NIC17 | MAC17 | NORMAL | NWSW1,port9,PORT VLAN | | | |
| | | NIC18 | MAC18 | NORMAL | NWSW1,port14,PORT VLAN | | | |
| | | NIC19 | MAC19 | NORMAL | NWSW2,port5,TAG VLAN | | | |
| --- | --- | --- | --- | --- | --- | --- | --- | --- |

FIG. 8

| 74A VIRTUAL SERVER IDENTIFIER | 74B UUID | 74C I/O DEVICE | | | | | 74D VIRTUALIZATION TYPE | 74E PERFORMANCE INFORMATION |
|---|---|---|---|---|---|---|---|---|
| | | 74F VIRTUAL DEVICE | 74G VIRTUAL WWN | 74H CURRENT/STANDBY | 74I MODE | 74J SECURITY | | |
| VIRTUAL SERVER 1 | UUID 201 | vHBA11 | vWWN20 | CURRENT1 | OCCUPIED | HG01 | COMPANY A: VIRTUALIZATION MECHANISM 1 | CPU:3GHz/core:1/SHARED memory:4GB/SHARED HDD(SAS):120GB NIC:1Gbps,HBA:3Gbps |
| | | vHBA12 | vWWN21 | STANDBY1 | SHARED | HG01 | | |
| | | vNIC11 | vMAC21 | CURRENT1 | OCCUPIED | NONE | | |
| | | vNIC12 | vMAC22 | STANDBY1 | SHARED | NONE | | |
| VIRTUAL SERVER 2 | UUID 202 | vHBA21 | vWWN22 | CURRENT1 | OCCUPIED | HG02 | COMPANY A: VIRTUALIZATION MECHANISM 1 | CPU:3GHz/core:1/SHARED memory:4GB/SHARED HDD(SAS):120GB NIC:1Gbps,HBA:3Gbps |
| | | vHBA22 | vWWN23 | STANDBY1 | SHARED | HG02 | | |
| | | vNIC21 | vMAC23 | CURRENT1 | SHARED | VLAN1 | | |
| | | vNIC22 | vMAC24 | STANDBY1 | SHARED | VLAN1 | | |
| VIRTUAL SERVER 3 | UUID 203 | vHBA31 | vWWN24 | CURRENT1 | SHARED | HG03 | COMPANY A: VIRTUALIZATION MECHANISM 1 | CPU:3GHz/core:2/SHARED memory:4GB/SHARED NIC:1Gbps,HBA:3Gbps |
| | | vNIC31 | vWWN25 | CURRENT1 | OCCUPIED | VLAN1 | | |
| | | vNIC32 | vMAC26 | CURRENT1 | SHARED | VLAN1 | | |
| | | vNIC32 | vMAC27 | CURRENT2 | SHARED | VLAN2 | | |
| VIRTUAL SERVER 4 | UUID 204 | vHBA41 | vWWN25 | CURRENT1 | SHARED | HG03 | COMPANY A: VIRTUALIZATION MECHANISM 1 | CPU:3GHz/core:2/SHARED memory:4GB/SHARED NIC:1Gbps,HBA:3Gbps |
| | | vNIC41 | vWWN28 | CURRENT1 | OCCUPIED | VLAN1 | | |
| | | vNIC42 | vMAC29 | STANDBY1 | SHARED | VLAN1 | | |
| | | vNIC43 | vMAC30 | CURRENT2 | SHARED | VLAN2 | | |
| VIRTUAL SERVER 5 | UUID 205 | vHBA51 | vWWN26 | CURRENT1 | SHARED | HG04 | COMPANY B: VIRTUALIZATION MECHANISM 2 | CPU:1.6GHz/core:2/SHARED memory:4GB/SHARED HDD(SATA):80GB NIC:1Gbps,HBA:3Gbps |
| | | vvNIC51 | vWWN31 | CURRENT1 | OCCUPIED | VLAN3 | | |
| | | vNIC52 | vMAC32 | STANDBY1 | SHARED | VLAN3 | | |
| | | vNIC53 | vMAC33 | CURRENT2 | SHARED | VLAN4 | | |
| VIRTUAL SERVER 6 | UUID 206 | vHBA61 | vWWN27 | CURRENT1 | SHARED | HG015 | COMPANY B: VIRTUALIZATION MECHANISM 2 | CPU:1.6GHz/core:2/SHARED memory:4GB/SHARED HDD(SATA):80GB NIC:1Gbps,HBA:3Gbps |
| | | vNIC61 | vMAC34 | CURRENT1 | OCCUPIED | VLAN3 | | |
| | | vNIC62 | vMAC35 | CURRENT1 | SHARED | VLAN3 | | |
| | | vNIC63 | vMAC36 | CURRENT2 | SHARED | VLAN4 | | |
| VIRTUAL SERVER 7 | UUID 207 | vHBA71 | vWWN38 | CURRENT1 | SHARED | HG05 | COMPANY B: VIRTUALIZATION MECHANISM 2 | CPU:1.6GHz/core:2/SHARED memory:4GB/SHARED HDD(SAS):80GB NIC:1Gbps,HBA:3Gbps |
| | | vNIC71 | vWWN37 | CURRENT1 | OCCUPIED | VLAN3 | | |
| | | vNIC72 | vMAC38 | STANDBY1 | SHARED | VLAN3 | | |
| | | vNIC73 | vMAC39 | CURRENT2 | SHARED | VLAN4 | | |
| --- | --- | --- | --- | --- | --- | --- | --- | --- |

FIG. 9

| OS IDENTIFI-CATION | UUID | OS TYPE | OS CONFIGURATION INFORMATION | REDUNDANCY |
|---|---|---|---|---|
| OS1 | UUID 301 | OS-a /IA32 | IP Address 311<br>Host Name 321<br>ID 331,Password 341<br>DiskImage 351 | NETWORK: TUNING |
| OS2 | UUID 302 | OS-b /IA32 | IP Address 312<br>Host Name 322<br>ID 332,Password 342<br>DiskImage 352 | NONE |
| OS3 | UUID 303 | OS-c /IA32 | IP Address 313<br>Host Name 323<br>ID 333,Password 343<br>DiskImage 353 | FC: LINKUP APPLICATION<br>DISK: RAID5<br>ETHERNET NETWORK: TRACKING |
| OS4 | UUID 304 | OS-d /IA32 | IP Address 314<br>Host Name 324<br>ID 334,Password 344<br>DiskImage 354 | DISK: RAID1 |
| OS5 | UUID 305 | OS-a /IA32 | IP Address 315<br>Host Name 325<br>ID 335,Password 345<br>DiskImage 355 | CLUSTER SOFTWARE USAGE |
| OS6 | UUID 306 | OS-a /IA32 | IP Address 316<br>Host Name 326<br>ID 336,Password 346<br>DiskImage 356 | FT SERVER USAGE |
| OS7 | UUID 307 | OS-a /IA32 | IP Address 317<br>Host Name 327<br>ID 337,Password 347<br>DiskImage 357 | COLD STANDBY CONFIGURATION USAGE |
| ⋮ | ⋮ | ⋮ | ⋮ | ⋮ |
| 75A | 75B | 75C | 75D | 75F |

| TASK IDENTIFIER | UUID | TASK TYPE | TASK CONFIGURATION INFORMATION | PRIORITY RANKING SLA |
|---|---|---|---|---|
| TASK 1 | UUID 401 | SOFTWARE A | ID 431,Password 441<br>DiskImage 451<br>PortNumber 461 | PRIORITY RANKING:1<br>SLA: ADAPTER OCCUPIED |
| TASK 2 | UUID 402 | SOFTWARE B | ID 432,Password 442<br>DiskImage 452<br>PortNumber 462 | PRIORITY RANKING: 4<br>SLA: BEST EFFORT |
| TASK 3 | UUID 403 | SOFTWARE B | ID 433,Password 443<br>DiskImage 453<br>PortNumber 463 | PRIORITY RANKING: 2<br>SLA: STORAGE OCCUPIED,<br>IP NETWORK SHARED,<br>RESPONSE TIME: WITHIN 100 ms |
| TASK 4 | UUID 404 | SOFTWARE B | ID 434,Password 444<br>DiskImage 454<br>PortNumber 464 | PRIORITY RANKING: 3<br>SLA: STORAGE OCCUPIED,<br>IP NETWORK: SHARED |
| TASK 5 | UUID 405 | SOFTWARE C | ID 435,Password 445<br>DiskImage 455<br>PortNumber 465 | PRIORITY RANKING: 5<br>SLA: OTHER PRIORITY<br>TASK DISCONTINUITY<br>UNAVOIDABLE |
| ⋮ | ⋮ | ⋮ | ⋮ | ⋮ |
| 76A | 76B | 76C | 76D | 76E |

| SYSTEM IDENTIFIER | UUID | PHYSICAL SERVER | VIRTUAL SERVER | OS | TASK |
|---|---|---|---|---|---|
| SYSTEM 1 | UUID 501 | PHYSICAL SERVER IDENTIFIER 1 | VIRTUAL SERVER IDENTIFIER 2 | OS IDENTIFIER 1 | TASK IDENTIFIER 1 |
| SYSTEM 2 | UUID 502 | PHYSICAL SERVER IDENTIFIER 2 | VIRTUAL SERVER IDENTIFIER 2 | OS IDENTIFIER 2 | TASK IDENTIFIER 2 |
| SYSTEM 3 | UUID 503 | PHYSICAL SERVER IDENTIFIER 3 | VIRTUAL SERVER IDENTIFIER 3 | OS IDENTIFIER 3 | TASK IDENTIFIER 3 |
| SYSTEM 4 | UUID 504 | PHYSICAL SERVER IDENTIFIER 4 | VIRTUAL SERVER IDENTIFIER 4 | OS IDENTIFIER 4 | TASK IDENTIFIER 4 |
| SYSTEM 5 | UUID 505 | PHYSICAL SERVER IDENTIFIER 5 | VIRTUAL SERVER IDENTIFIER 5 | OS IDENTIFIER 5 | TASK IDENTIFIER 5 |
| SYSTEM 6 | UUID 506 | PHYSICAL SERVER IDENTIFIER 4,5 | VIRTUAL SERVER IDENTIFIER 6 | OS IDENTIFIER 6 | TASK IDENTIFIER 6 |
| SYSTEM 7 | UUID 507 | PHYSICAL SERVER IDENTIFIER 6 | VIRTUAL SERVER IDENTIFIER 7 | OS IDENTIFIER 7 | TASK IDENTIFIER 7 |
| ⋮ | ⋮ | ⋮ | ⋮ | ⋮ | ⋮ |
| 77A | 77B | 77C | 77D | 77E | 77F |

FIG. 12

| VIRTUAL SERVER IDENTIFIER | VIRTUAL ADAPTER | CURRENT /STANDBY | MODE | SECURITY | SECURITY TYPE | PHYSICAL ADAPTER | STATUS |
|---|---|---|---|---|---|---|---|
| VIRTUAL SERVER IDENTIFIER 1 | vHBA11 | CURRENT 1 | OCCUPIED | HG01 | SAN SECURITY | HBA1 | NORMAL |
| | vHBA12 | STANDBY 1 | SHARED | HG01 | SAN SECURITY | HBA2,HBA21,HBA22 | NORMAL |
| | vNIC11 | CURRENT 1 | SHARED | NONE | NONE | NIC1 | NORMAL |
| | vNIC12 | STANDBY 1 | SHARED | NONE | NONE | NIC2,NIC21 | NORMAL |
| VIRTUAL SERVER IDENTIFIER 2 | vHBA21 | CURRENT 1 | OCCUPIED | HG02 | SAN SECURITY | HBA3 | NORMAL |
| | vHBA22 | STANDBY 1 | SHARED | HG02 | SAN SECURITY | HBA2,HBA21,HBA22 | NORMAL |
| | vNIC21 | CURRENT 1 | SHARED | VLAN1 | TAG VLAN | NIC3 | NORMAL |
| | vNIC22 | STANDBY 1 | SHARED | VLAN1 | TAG VLAN | NIC2,NIC21 | NORMAL |
| VIRTUAL SERVER IDENTIFIER 3 | vHBA31 | CURRENT 1 | SHARED | HG03 | SAN SECURITY | HBA4,HBA41 | NORMAL |
| | vHBA32 | CURRENT 1 | OCCUPIED | VLAN1 | PORT VLAN | NIC4 | "FAULT" |
| | vNIC32 | STANDBY 1 | SHARED | VLAN1 | TAG VLAN | NIC5,NIC51 | STANDBY/NIC5 EXCLUSIVE/NORMAL |
| | vNIC33 | CURRENT 2 | SHARED | VLAN2 | TAG VLAN | NIC6,NIC61 | NORMAL |
| VIRTUAL SERVER IDENTIFIER 4 | vHBA41 | CURRENT 1 | SHARED | HG03 | SAN SECURITY | HBA4,HBA41 | NORMAL |
| | vNIC41 | CURRENT 1 | OCCUPIED | VLAN1 | PORT VLAN | NIC7 | NORMAL |
| | vNIC42 | STANDBY 1 | SHARED | VLAN1 | TAG VLAN | NIC5,NIC51 | STANDBY/NIC51 SHARED/NORMAL |
| | vNIC43 | CURRENT 2 | SHARED | HG04 | SAN SECURITY | NIC6,NIC61 | NORMAL |
| VIRTUAL SERVER IDENTIFIER 5 | vHBA51 | CURRENT 1 | SHARED | VLAN3 | SAN SECURITY | HBA4,HBA41 | NORMAL |
| | vNIC51 | CURRENT 1 | OCCUPIED | VLAN3 | PORT VLAN | NIC8 | NORMAL |
| | vNIC52 | STANDBY 1 | SHARED | VLAN3 | TAG VLAN | NIC5,NIC51 | STANDBY/NIC51 SHARED/NORMAL |
| | vNIC53 | CURRENT 2 | SHARED | VLAN4 | TAG VLAN | NIC6,NIC61 | NORMAL |
| VIRTUAL SERVER IDENTIFIER 6 | vHBA61 | CURRENT 1 | SHARED | HG05 | SAN SECURITY | HBA5HBA51 | NORMAL |
| | vNIC61 | CURRENT 1 | OCCUPIED | VLAN3 | PORT VLAN | NIC9 | NORMAL |
| | vNIC62 | STANDBY 1 | SHARED | VLAN3 | TAG VLAN | NIC10 | NORMAL |
| | vNIC63 | CURRENT 2 | SHARED | VLAN4 | TAG VLAN | NIC11 | NORMAL |
| VIRTUAL SERVER IDENTIFIER 7 | vHBA71 | CURRENT 1 | OCCUPIED | HG05 | SAN SECURITY | HBA5HBA51 | NORMAL |
| | vNIC71 | CURRENT 1 | OCCUPIED | VLAN3 | PORT VLAN | NIC12 | NORMAL |
| | vNIC72 | STANDBY 1 | SHARED | VLAN3 | TAG VLAN | NIC10 | NORMAL |
| | vNIC73 | CURRENT 2 | SHARED | VLAN4 | TAG VLAN | NIC11 | NORMAL |

FIG. 13

| REQUEST | REQUEST TYPE | DISTRIBUTION INSTRUCTION |
|---|---|---|
| REQUEST IDENTIFIER 1 | VITAL MONITORING | ARP (ONCE/WITHIN 5 MIN): 1) PROCESSING BY OTHER STANDBY PHYSICAL ADAPTER<br>2) PROCESSING BY ADAPTER WITH LOW PRIORITY RANKING IF ABOVE DOES NOT APPLY<br>3) PROCESSING BY ADAPTER WITH LOW LOAD IF ABOVE DOES NOT APPLY<br>HIGHER LEVELS: DOES NOT PASS<br>PING (ONCE/WITHIN 10 MIN): PASS<br>HIGHER LEVELS: PASS WITH LIMITED QUANTITY<br>MII: 1) PROCESSING BY OTHER STANDBY PHYSICAL ADAPTER<br>2) PROCESSING BY ADAPTER WITH LOW LOAD IF ABOVE DOES NOT APPLY |
| REQUEST IDENTIFIER 2 | MULTICAST | 1) PROCESSING BY OTHER STANDBY PHYSICAL ADAPTER<br>2) PROCESSING BY ADAPTER WITH LOW LOAD IF ABOVE DOES NOT APPLY |
| REQUEST IDENTIFIER 3 | UNICAST | PASS |
| REQUEST IDENTIFIER 4 | SAME ADDRESS | COLLECTIVE PROCESSING BY SAME PHYSICAL ADAPTER |
| REQUEST IDENTIFIER 5 | SAME SOURCE | COLLECTIVE PROCESSING BY SAME PHYSICAL ADAPTER |
| REQUEST IDENTIFIER 6 | PACKET SIZE GREATER THAN THRESHOLD | 1) PROCESSING BY ANOTHER STANDBY PHYSICAL ADAPTER<br>2) PROCESSING BY ADAPTER WITH LOW PRIORITY RANKING IF ABOVE DOES NOT APPLY<br>3) PROCESSING BY ADAPTER WITH LOW LOAD IF ABOVE DOES NOT APPLY<br>4) DO NOT PASS IF ABOVE DOES NOT APPLY |
| REQUEST IDENTIFIER 7 | PACKET SIZE LESS THAN THRESHOLD | 1) PROCESSING BY ANOTHER ADAPTER<br>2) PROCESSING BY ADAPTER WITH LOW PRIORITY RANKING IF ABOVE DOES NOT APPLY<br>3) PROCESSING BY ADAPTER WITH LOW LOAD IF ABOVE DOES NOT APPLY<br>4) PASS USING SHARED ADAPTER OPERATING IF ABOVE DOES NOT APPLY |
| ... | ... | ... |

85A  85B  85C  85

COMPUTER SYSTEM AND AVAILABILITY METHOD THEREOF

CROSS-REFERENCE TO RELATED PATENT APPLICATIONS

This application is a US national phase application of PCT application PCT/JP2010/001535 filed Mar. 5, 2010 which claims priority from Japan Priority Application 2010-000609, filed Jan. 5, 2010. All of the aforesaid applications are incorporated herein by reference in their entirety as if fully set forth herein.

TECHNICAL FIELD

The present invention relates to a computer system and availability method thereof and is, for example, suitably applied to a computer system in which physical devices and virtual devices exist in a multiplexed configuration with the object of establishing redundancy.

BACKGROUND ART

In recent years, due to advances in virtualization technology, it has become possible to operate a plurality of virtual servers on a single physical server. By using such virtualization technology to operate a plurality of virtual servers on a single physical server, physical computer resources can be reduced and costs can be lowered.

Meanwhile, if a plurality of virtual servers are operated on a single physical server as mentioned above, physical computer resources are shared between a plurality of virtual servers; however, if physical computer resources are shared between a plurality of virtual servers, there is a problem in that the performance and availability of individual virtual servers are reduced.

Therefore, Cited document 1 discloses a technology for allocating, for occupied usage, specific physical computer resources (hereinafter called physical computer resources) to computer resources (hereinafter referred to as virtual computer resources) which are used as a current system of a virtual server, and for allocating, for shared usage, other physical computer resources to virtual computer resources of a standby system of the virtual server.

CITATION LIST

Patent Literature

[PTL 1]
Japanese Unexamined Published Application No. 4295783.

SUMMARY OF INVENTION

Technical Problem

Incidentally, as mentioned hereinabove, in a computer system in which specific physical computer resources (hereinafter called physical computer resources of a current system) are allocated, for occupied usage, to virtual computer resources of a current system of a virtual server, and in which other physical computer resources (hereinafter referred to as physical computer resources of a standby system) are allocated, for shared usage, to virtual computer resources of a standby system of the virtual server, if a fault occurs in the physical computer resources of the current system, availability can be improved by continuing the processing using the virtual computer resources of a standby system of the virtual server.

In this case, in this computer system, because physical computer resources of the standby system are allocated to a plurality of virtual computer resources of the standby system in an equal or smaller number, one of the following two countermeasures must be selected as a countermeasure when the foregoing fault occurs.

(1) To maintain performance by allocating (assigning for occupancy) 100 percent of the physical computer resources of the standby system to the virtual computer resources of the standby system.

(2) Giving up a larger amount of virtual computer resources at the expense of performance.

If the former countermeasure is adopted, the performance of the virtual server, to which the physical computer resources in which the fault occurred have been allocated, can be maintained. However, since requests that have been distributed to the physical computer resources up to that point are then distributed among the physical computer resources of the other standby system, the overall performance of the system drops, which is problematic. Furthermore, for example, in a system where there is only one standby-system physical computer resource, if a fault then occurs in a physical computer resource of another current system, there is a problem in that tasks executed by the virtual server to which the physical computer resources where the fault occurred have been allocated can no longer be rescued.

The present invention was conceived in view of the above points and proposes a high availability computer system and fault correction method which enable the greatest possible performance to be maintained while rescuing a greater number of tasks.

Solution to Problem

In order to achieve the foregoing object, the present invention provides a computer system comprising a physical server, wherein the physical server comprises current-system and standby-system physical devices; and a virtualization mechanism which provides a plurality of virtual servers each comprising a current-system virtual device obtained by virtualizing the current-system physical device, and a standby-system virtual device obtained by virtualizing the standby-system physical device, wherein the virtualization mechanism comprises a function which allocates, for occupied usage, the current-system physical device to the current-system virtual device of the virtual server and which allocates, for shared usage, the virtual-system physical device to the standby-system virtual device of the virtual server, and which distributes a request issued from the current-system or standby-system virtual device of the virtual server to the current-system or standby-system physical device allocated to the current-system or standby-system virtual device, wherein, if a fault occurs in the current-system physical device allocated to the current-system virtual device of the virtual server, the virtualization mechanism configures, for the standby-system virtual device of the virtual server, the standby-system physical device, which has not been configured as a physical device which is also used at high priority by the standby-system virtual device of any of the virtual servers, as a physical device which is used by the standby-system virtual device at a higher priority than the other standby-system virtual devices, and wherein the virtualization mechanism distributes the request issued from the standby-system virtual device of the virtual server to the standby-system physical device configured as a physical device which is used at a high priority by the standby-system virtual device of the virtual server.

Furthermore, the present invention provides an availability method for a computer system comprising a physical server, wherein the physical server comprises current-system and standby-system physical devices; and a virtualization mechanism which provides a plurality of virtual servers each comprising a current-system virtual device obtained by virtualizing the current-system physical device, and a standby-system virtual device obtained by virtualizing the standby-system physical device, the availability method comprising a first step in which the virtualization mechanism allocates, for occupied usage, the current-system physical device to the current-system virtual device of the virtual server and which allocates, for shared usage, the virtual-system physical device to the standby-system virtual device of the virtual server, and which distributes a request issued from the current-system or standby-system virtual device of the virtual server to the current-system or standby-system physical device allocated to the current-system or standby-system virtual device; and a second step in which, if a fault occurs in the current-system physical device allocated to the current-system virtual device of the virtual server, the virtualization mechanism configures, for the standby-system virtual device of the virtual server, the standby-system physical device, which has not been configured as a physical device which is also used at high priority by the standby-system virtual device of any of the virtual servers, as a physical device which is used by the standby-system virtual device at a higher priority than the other standby-system virtual devices, and in which the virtualization mechanism distributes the request issued from the standby-system virtual device of the virtual server to the standby-system physical device configured as a physical device which is used at a high priority by the standby-system virtual device of the virtual server.

Advantageous Effects of Invention

The present invention makes it possible to implement a high availability computer system and availability method thereof which are capable of rescuing not only tasks which are executed by the virtual server to which the physical adapter where the fault occurred was allocated, but also other tasks while, as far as possible, maintaining the processing performance of these tasks due to a request being distributed to a standby-system physical device configured as a physical device which is used at a high priority by a standby-system physical device of any of the virtual servers when the standby-system physical device, which has not been configured as a physical device which is used at a high priority by the standby-system virtual device of any of the virtual servers, does not exist.

BRIEF DESCRIPTION OF DRAWINGS

FIG. 7 is a conceptual diagram serving to illustrate a physical server management table.
FIG. 8 is a conceptual diagram serving to illustrate a virtual server management table.
FIG. 9 is a conceptual diagram serving to illustrate an OS management table.
FIG. 10 is a conceptual diagram serving to illustrate tasks and an SLA management table.
FIG. 11 is a conceptual diagram serving to illustrate a system management table.
FIG. 12 is a conceptual diagram serving to illustrate an adapter management table.
FIG. 13 is a conceptual diagram serving to illustrate a request type management table.

DESCRIPTION OF EMBODIMENTS

An embodiment of the present invention will be described in detail hereinbelow with reference to the drawings.

Figure 1:
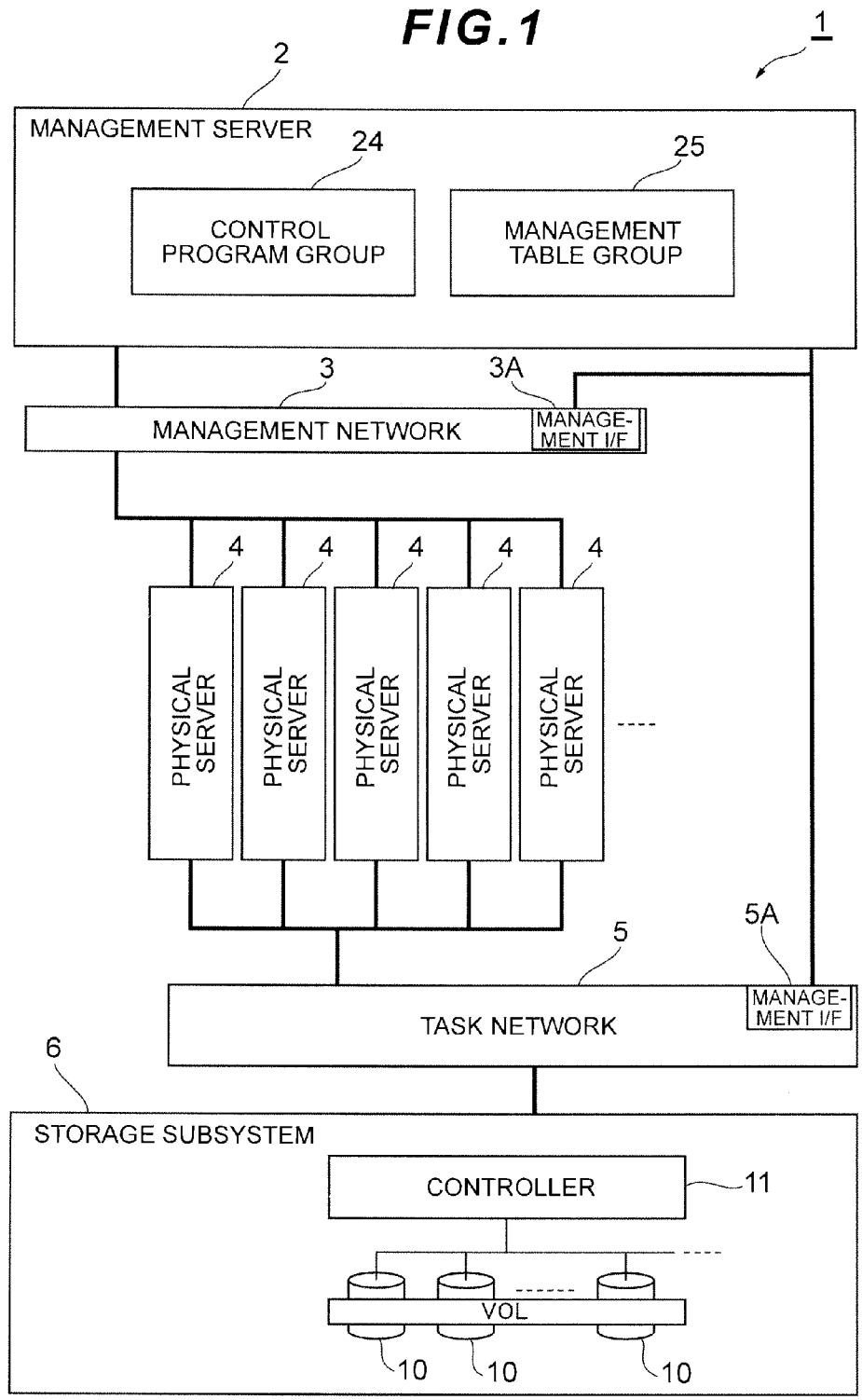
FIG. 1 is a block diagram showing the overall configuration of a computer system according to this embodiment.

(1) First Embodiment (1-1) Configuration of Computer System According to this Embodiment In FIG. 1, 1 denotes the computer system according to this embodiment overall. The computer system 1 is configured from a management server 2, a management network 3, a plurality of physical servers 4, a task network 5, and a storage subsystem 6.

The management server 2 is a server apparatus which is used to manage the physical servers 4 in the computer system 1 and is connected to each of the physical servers 4 via the management network 3. Further, the management server 2 is connected to a management interface 3A of the management network 3 and a management interface 5A of the task network 5 respectively, and a VLAN (Virtual LAN) of the management network 3 and the task network 5 can be configured from the management server 2.

The management network 3 is configured from a LAN (Local Area Network), the Internet, or a public switched line or dedicated line or the like, for example. The management network 3 is used to perform operations management of the physical server 4 such as the distribution of an OS (Operating System) or application and power source control or the like.

The physical server 4 is configured from a blade server, for example. Installed on the physical server 4 is virtualization software known as a hypervisor and, by executing the virtualization software, this virtualization software is configured so that it is possible to operate one or a plurality of virtual servers on a virtualization mechanism, described subsequently, which is constructed.

The task network 5 is configured from an FC-SAN (Fibre Channel-Storage Area Network) or IP-SAN (Internet Protocol-Storage Area Network) or the like, for example. The task network 5 is used by a virtual server which runs on the physical servers 4 to read and write data from and to the storage subsystem 6.

The storage subsystem 6 is a storage apparatus which provides storage area for reading and writing data from and to the physical servers 4 and is configured from a plurality of storage devices 10 and a controller 11 for controlling data I/Os to and from the plurality of storage devices 10.

The storage device 10 is configured, for example, from a high-cost disk device such as a SCSI (Small Computer System Interface) disk or a low-cost disk device such as a SATA (Serial AT Attachment) disk or optical disk.

The storage devices 10 are operated in a RAID (Redundant Arrays of Inexpensive Disks) system by the controller 11. One or more logical volumes (hereinafter called logical volumes) VOL are configured in a physical storage area provided by one or more storage devices 10. Furthermore, the data is stored in the logical volume VOL with blocks of a predetermined size serving as units.

Figure 2:
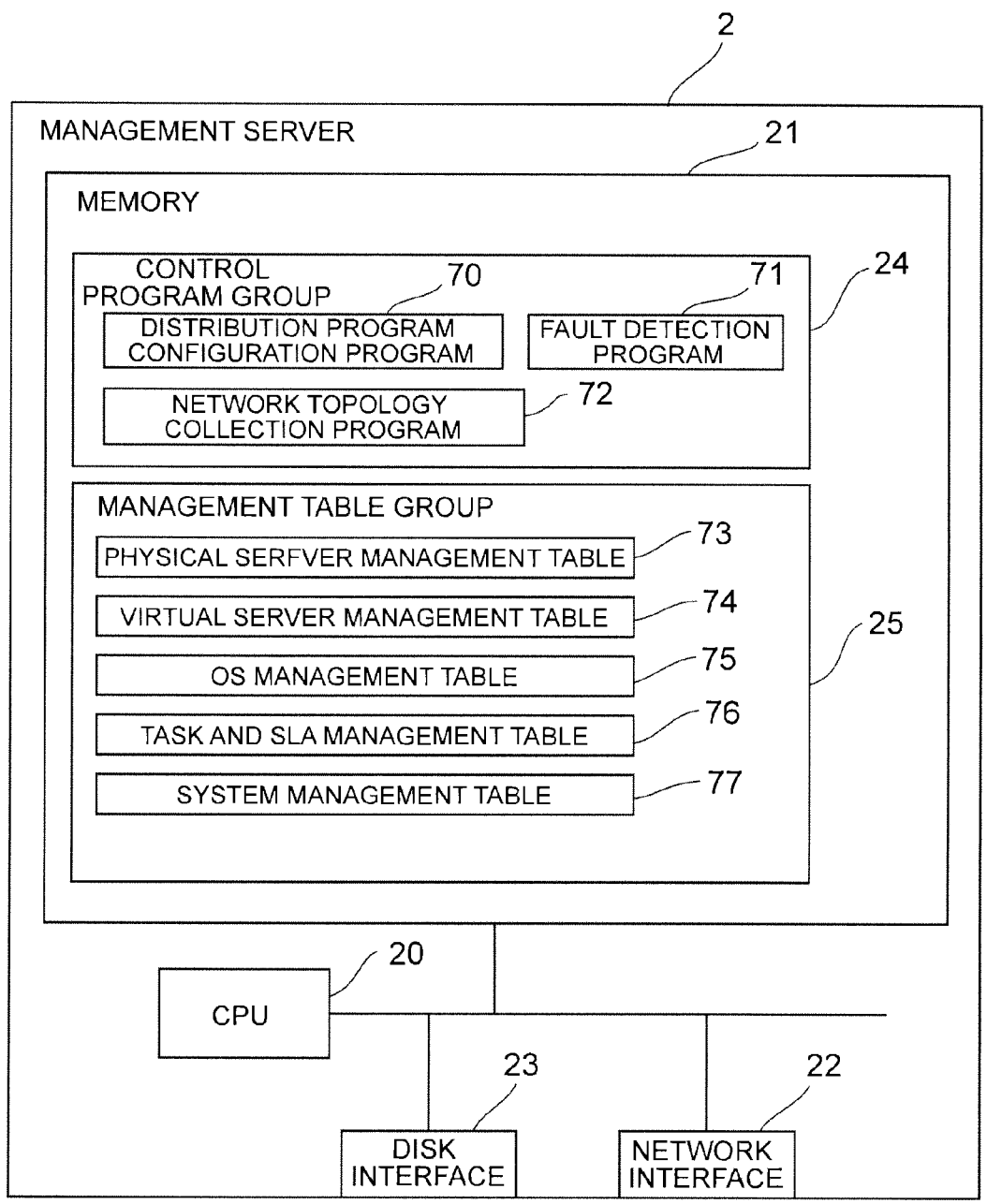
FIG. 2 is a block diagram showing the overall configuration of a management server.

FIG. 2 shows the overall configuration of the management server 2. As shown in FIG. 2, the management server 2 is configured comprising a CPU (Central Processing Unit) 20, a memory 21, a network interface 22, and a disk interface 23.

The CPU 20 is a processor which governs operations control for the whole management server 2 and which, at startup, loads programs and data onto the memory 21 from an external disk apparatus (not shown) and executes various processing on the basis of the loaded programs and data. The memory 21 is also used as the working memory of the CPU 20 in addition to being used to store the programs and data and so on loaded from the external disk apparatus. A control program group 24 and a management table group 25, described subsequently, are also held stored in the memory 21.

The network interface 22 functions as an interface used by the management server 2 to communicate with the physical servers 4 via the management network 3 and executes processing such as protocol exchange during communications between the management server 2 and the physical servers 4. Further, the disk interface 23 functions as an interface with the foregoing external disk apparatus.

Note that, although one each of the network interface 22 and the disk interface 23 are shown in FIG. 2, in reality, a plurality of the network interface 22 and the disk interface 23 exist. For example, the network interface 22 with the management network 3 and the network interface 22 with the task network 5 are used separately.

Figure 3:
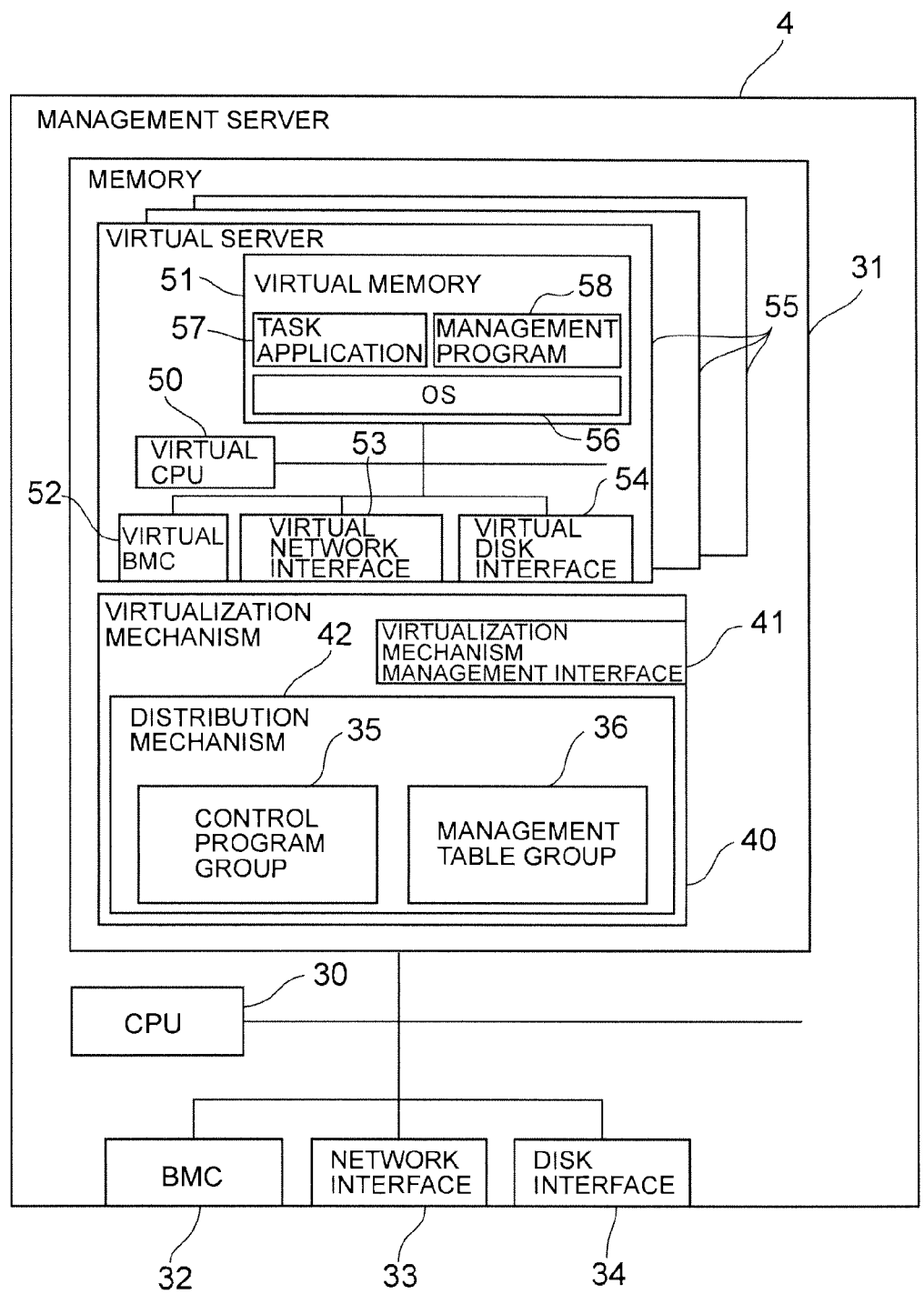
FIG. 3 is a block diagram showing the overall configuration of a physical server.

As shown in FIG. 3, the physical server 4 is configured comprising a CPU 30, a memory 31, a BMC (Basement Management Controller) 32, a network interface 33 and a disk interface 34.

The CPU 30 is a processor which governs operations control for the whole physical server 4 and which loads an OS (Operating System), various programs such as various task application programs and management programs, and required data into the memory 31 from an external disk apparatus not shown during startup, and executes various processing according to the loaded programs. In addition to being used to store various programs and data and so on loaded from the external disk apparatus, the memory 31 is also used as the working memory of the CPU 30. A control program group 35 and a management table group 36, described subsequently, are also stored and held in the memory 21.

A BMC 32 performs power source control and control of each interface. Further, the network interface 33 and the disk interface 34 have the same functions as the network interface 33 and disk interface 34 of the management server 20 and communicate with the management server 2 via the management network 3 or are used as interfaces when data is sent and received to and from the storage subsystem 6 via the task network 5.

Note that, in FIG. 3, one each of the network interface 33 and the disk interface 34 are shown but, in reality, a plurality of the network interface 33 and the disk interface 34 exist. For example, the network interface 33 with the management network 3 and the network interface 33 with the task network 5 are each used separately.

Here, as shown in FIG. 3, a virtualization mechanism 40 which is constructed by executing virtualization software which is loaded from the external disk apparatus is deployed to the memory 31 of the physical server 4. The virtualization mechanism 40 comprises a function for virtualizing the computer resources of the physical servers 4 and provides one or more virtual servers 55 which comprise a virtual device group such as a virtual CPU 50, a virtual memory 51, a virtual BMC 52, a virtual network interface 53, and a virtual disk interface 54 which virtualize the CPU 30, the memory 31, the BMC 32, the network interface 33, and the disk interface 34 of the physical servers 4.

An OS 56 is stored logically in the virtual memory 51 of each virtual server 55 and a virtual device group in the virtual server 55 is managed by the virtual CPU 50 on the basis of the OS 56. Further, a task application program 57 is executed in the OS 56 so that individual task processing can be executed in each virtual server 55. Further, a management program 58 runs on the OS 56 so that fault detection, power source control of the OS 56, and inventory management and the like can be performed by the management program 58.

The virtualization mechanism 40 manages the association between the computer resources (physical computer resources) of the physical server 4 and the computer resources (virtual computer resources) of one or more virtual servers 55 operating on the physical server 4 and, by issuing an instruction to the virtualization mechanism 40 and is able, as a result of an instruction being issued to the virtualization mechanism 40 from the management server 2, it is possible to allocate physical computer resources to the virtual computer resources and cancel this allocation. Furthermore, the virtualization mechanism 40 manages configuration information and the operations history, i.e. to what extent the physical computer resources are allocated to each virtual server 55 and to what extent each virtual server 55 is using the physical computer resources same has been allocated.

As shown in FIG. 3, the virtualization mechanism 40 comprises a virtualization mechanism management interface 41 and a distribution mechanism 42, and a function (not shown) for virtualizing the computer resources of the physical servers 4 and for providing virtual servers 55.

Among the foregoing, the virtualization mechanism management interface 41 is an interface which enables the virtualization mechanism 40 to communicate with the management server 2, and which is used when information is reported by the virtualization mechanism 40 to the management server 2 or when an instruction is issued by the management server 2 to the virtualization mechanism 40. Note that the user is also able to directly use the virtualization mechanism management interface 41.

The distribution mechanism 42 comprises a function for distributing requests issued by the virtual network interface 53 of the standby system to the network interface 33 or the disk interface 34 of the standby system, and is configured comprising the control program group 35 and the management table group 36. Details of the control program group 35 and the management table group 36 will be provided subsequently.

In a case where a fault occurs in the network interface 33 or disk interface 34 of the physical server 4 allocated to the virtual network interface 53 or virtual disk interface 54 of the current system, the OS 56 of the virtual server 55 no longer performs communication via the virtual network interface 53 or virtual disk interface 54 of the current system. Hence, the OS 56 of the virtual server 55 comes to issue a request via the virtual network interface 53 or the virtual disk interface 54 of the standby system when this fault occurs.

That is, in response to a fault occurring in the network interface 33 or the disk interface 34 allocated to the virtual network interface 53 or the virtual disk interface 54 of the current system, a request is sent to the distribution mechanism 42 from the virtual network interface 53 or the virtual disk interface 54 of the standby system.

However, a vital monitoring request is issued by the virtual network interface 53 or the virtual disk interface 54 of the standby system not only when a fault occurs but even during normal operation. Therefore, the basic role of the distribution mechanism 42 according to this embodiment is, when a request from the virtual network interface 53 or the virtual disk interface 54 is received by the virtualization mechanism 40, to determine whether the received request is a vital monitoring request or a request other than a vital monitoring request (a request that is sent due to a fault with the network interface 33), and to distribute a request to the appropriate network interface 33 or disk interface 34.

Figure 4:
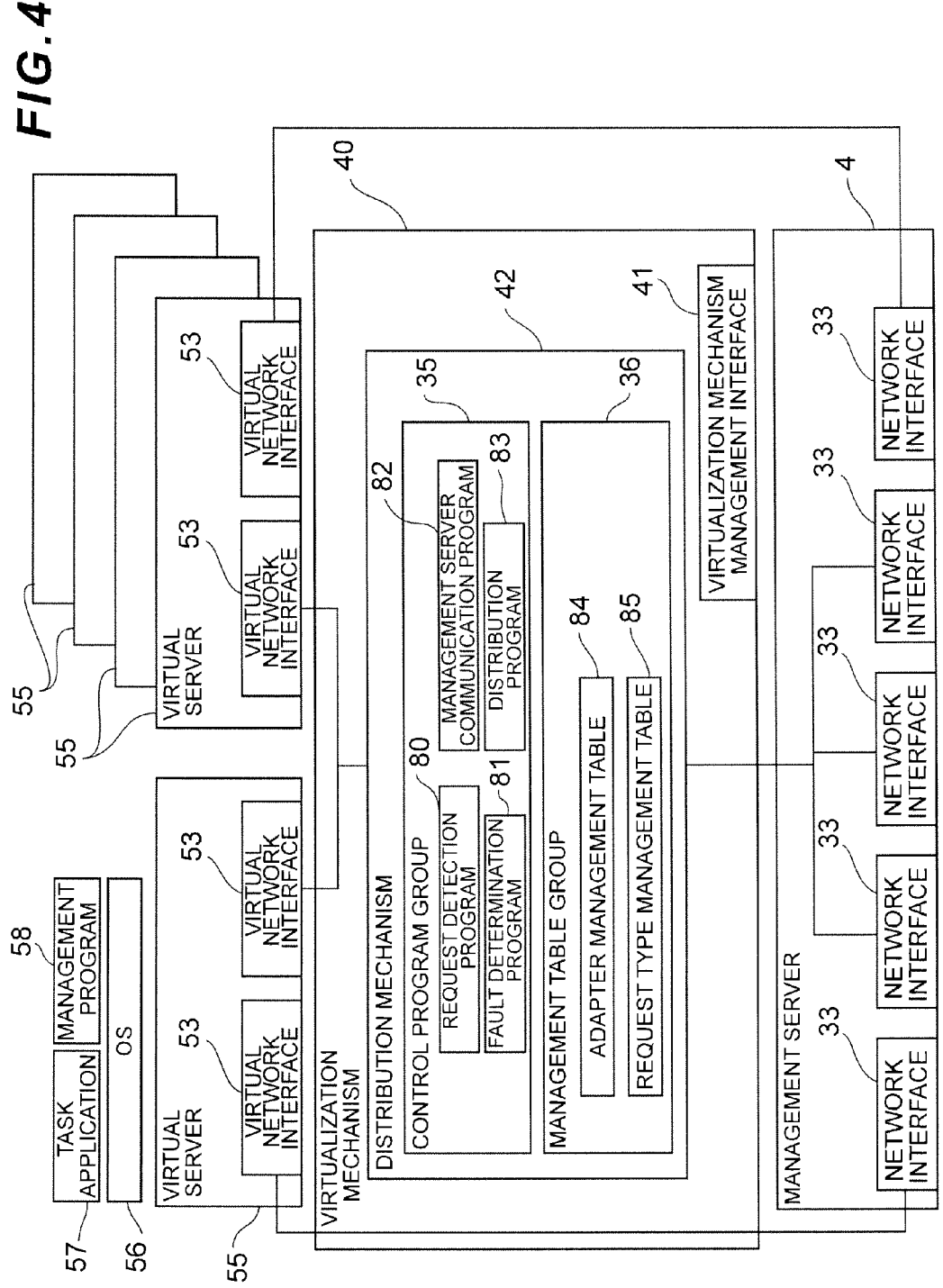
FIG. 4 is a block diagram serving to illustrate the overall configuration of the virtualization mechanism.

FIG. 4 shows the correspondence relationship between the network interface 33 of the physical server 4 virtualized by the virtualization mechanism 40 and the virtual network interface 53 of the virtual server 55. In the computer system 1 according to the embodiment, the network interface 33 of the physical server 4 is allocated in occupancy mode to the virtual network interface 53 of the current system of the virtual server 55.

Here, occupancy mode refers to an allocation mode in which a virtual device is able to occupy a physical device. Other than occupancy mode, as an allocation mode in which a physical device is allocated to a virtual device, there exists a shared mode in which a plurality of virtual devices share a single physical device. Although the user is able to designate either occupancy mode or shared mode as the allocation mode of the physical device allocated to the virtual device, as the operation policy, for example, even when the current system is in occupancy mode and the standby system is in shared mode, part of the occupancy mode and the shared mode may be allocated to the virtual device of the current system.

As described hereinabove, according to this embodiment, the network interface 33 is assigned in occupancy mode to the virtual network interface 53 of the current system, the virtual network interface 53 of the current system is able to utilize 100 percent of the network interface 33 allocated to same.

Meanwhile, in the case of the computer system 1 according to this embodiment, the network interface 33 of the physical server 4 is allocated, in shared mode via the distribution mechanism 42 in the virtualization mechanism 40, to the virtual network interface 53 of the standby system of the virtual server 55. Hence, an operation is permitted in which, for example, two network interfaces 33 of the physical server 4 are allocated to ten virtual network interfaces 53 and two network interfaces 33 are commonly used by the ten virtual network interfaces 53.

Accordingly, the virtual network interface 53 of the standby system can be configured for all the required virtual servers 55 and there is no need to simultaneously prepare an equal number of the network interfaces 33 of the physical servers 4 as the virtual network interfaces 53, enabling the number of the network interfaces 33 to be reduced. Furthermore, because the number of devices can be reduced in this way, a reduction in the amount of power consumed can be expected, enabling a cost reduction effect.

Note that the foregoing is not limited to the relationship between the network interfaces 33 of the physical servers 4 and the virtual network interface 53 of the virtual servers 55, rather, the same thing may be said of the relationship between the disk interfaces 34 of the physical servers 4 and the virtual disk interfaces 54 of the virtual servers 55.

(1-2) Request Distribution Function

The request distribution function described in the computer system 1 will be described next. Note that, in the following, the network interfaces 33 and the disk interfaces 34 of the physical servers 4 are referred to collectively as physical adapters 60 (FIG. 5), and the virtual network interfaces 53 and the virtual disk interface 54 of the virtual servers 55 are collectively called virtual adapters 61 (FIG. 5).

Figure 5:
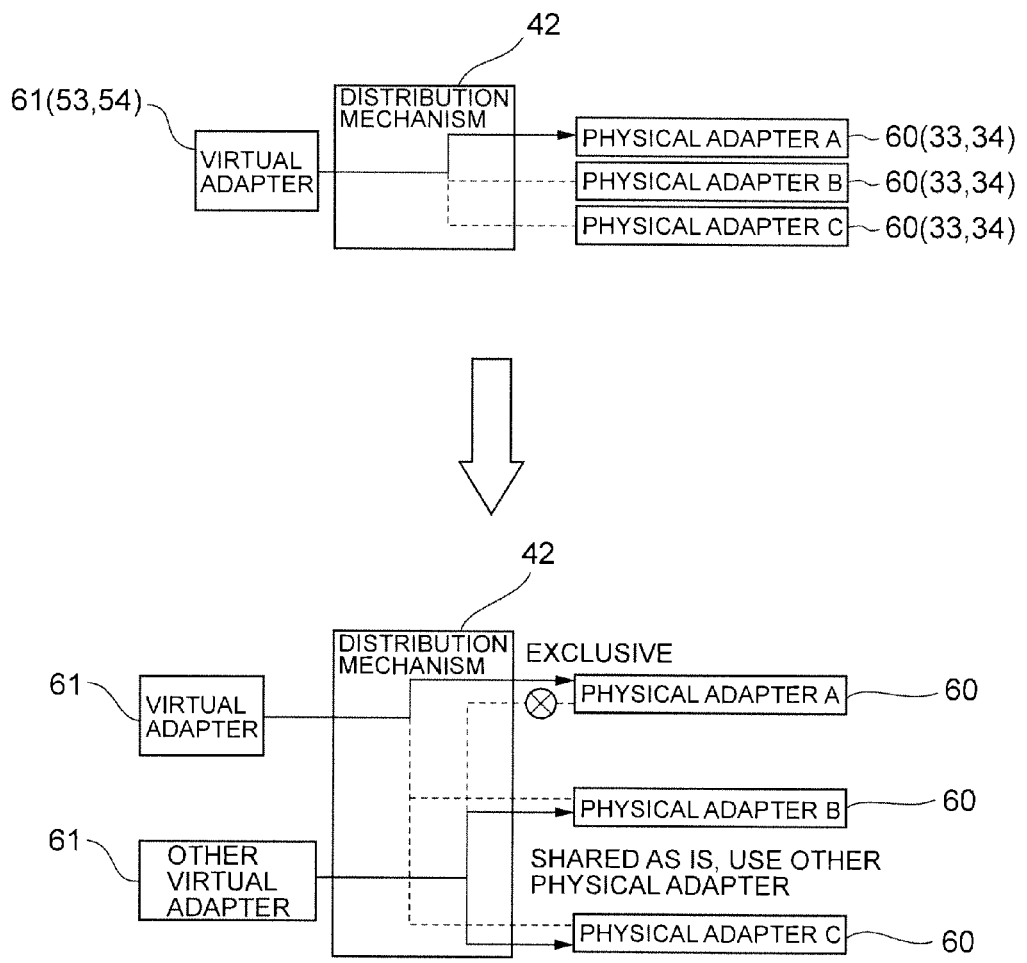
FIG. 5 is a conceptual diagram serving to illustrate a request distribution function according to this embodiment.

The computer system 1 comprises a function which, if a fault occurs in a physical adapter (physical adapter of current system) 60 which is allocated to virtual adapter 61 of the current system, specifies the virtual adapter 61 of the virtual server 55 to which the physical adapter 60 in which the fault occurred has been allocated and which, if there is a surplus in the physical adapter 60 of the standby system, that is, if a physical adapter 60 of the standby system which has not been configured as a high priority usage physical device also exists in the virtual adapter 61 of the standby system of any virtual server 55, determines one physical adapter 60 which the virtual adapter 61 uses at high priority ("physical adapter A" in FIG. 5) from among the physical adapters 60 of the standby system, and allocates the physical adapter 60 to the virtual adapter 61 while still in shared mode, as shown in FIG. 5.

Figure 6:
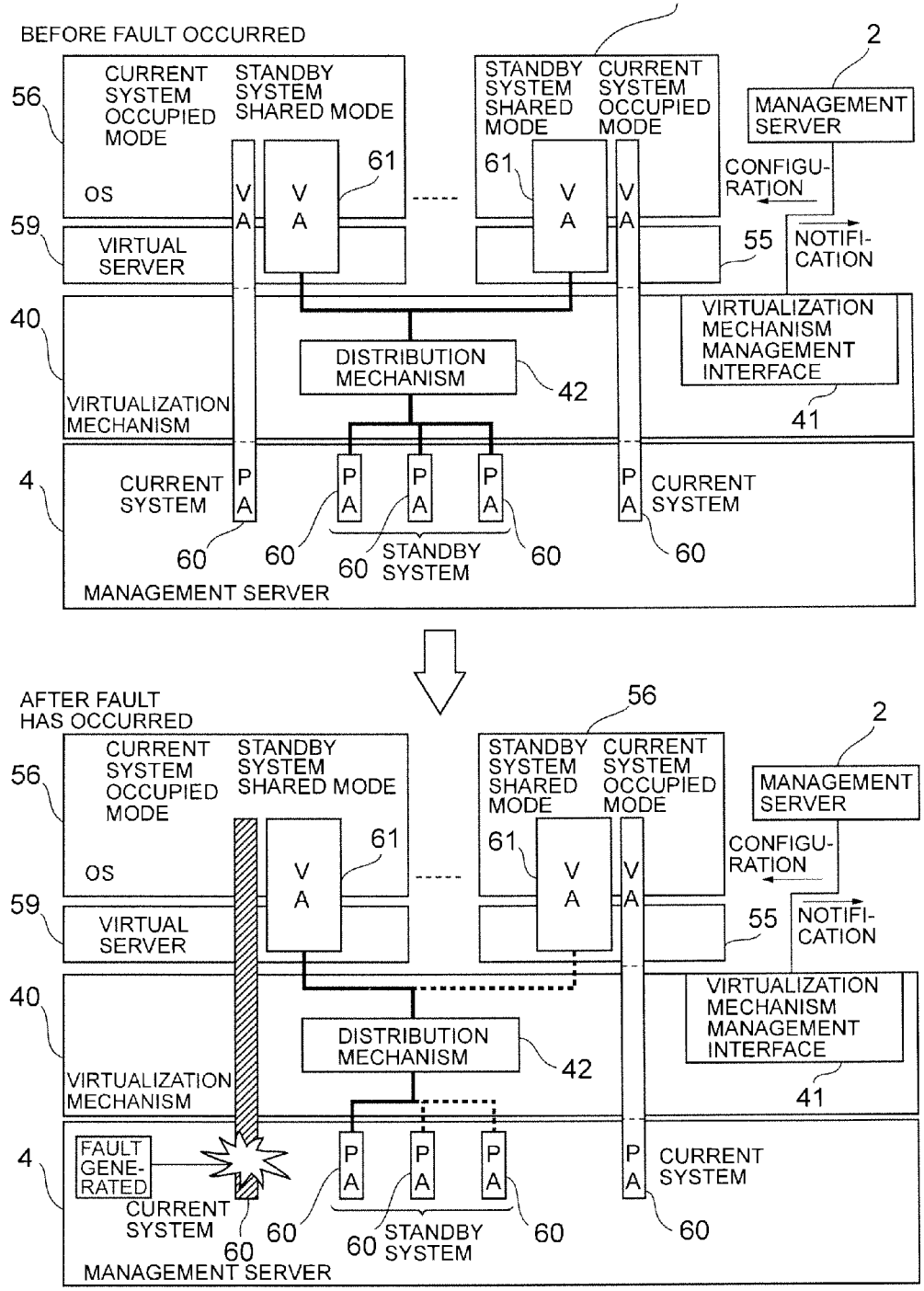
FIG. 6 is a conceptual diagram serving to illustrate a request distribution function according to this embodiment.

That is, as shown in FIG. 6, the virtualization mechanism 40 of the physical servers 4 according to the embodiment fulfills a role whereby, if a fault occurs in a physical adapter (PA: Physical Adapter) 60 allocated to the virtual adapter (VA: Virtual Adapter) 61 of the current system of the virtual server 55, one of the physical adapters 60 prepared as a standby system is allocated to the virtual adapter 61 of the standby system of the virtual server 55 and the virtual adapter 61 is made to use the physical adapter 60 at high priority. Furthermore, the virtualization mechanism 40 also fulfills the role of distributing requests from the virtual adapter 61 in which another fault is not generated to a physical adapter 60 of the standby system other than the physical adapter 60 configured for use at high priority.

In addition, in the case of the computer system 1, there is an arrangement whereby, if there is no surplus in the physical adapter 60 of the standby system, notification to that effect is issued to the management server 2 and the management server 2 determines, based on the priority ranking of a task being executed by the virtual server 55 to which the physical adapter 60 where the fault occurred is allocated, one physical adapter 60 which is capable of slotting in requests from among the physical adapters 60 already configured for high priority usage by another virtual adapter 61, and issues an instruction to the distribution mechanism 42 to distribute a request to the physical adapter 60.

As a result, it is possible to prevent stoppage of a highly important task even in a case where a fault occurs in the physical adapter 60 allocated to the virtual adapter 61 of the current system of the virtual server 55 which is charged with the highly important task in a state where there is no surplus in the physical adapter 60 of the standby system.

As mentioned hereinabove, a feature of the computer system 1 according to this embodiment is the fact that, when the physical adapter 60 of the standby system is allocated to the virtual adapter 61 of the standby system of the virtual server 55, the physical adapter 60 is allocated while still in shared mode. As a result, a task in which fault has occurred can be rescued without affecting tasks other than the task subject to the fault.

Contrary to the embodiment, when the physical adapter 60 of the standby system is switched to shared mode, there is a temporary problem in that only the rescued task is rescued. Further, if there is one physical adapter 60 of the standby system, when the switch to shared mode is made, vital monitoring requests and the like from other standby virtual adapters 61 cannot be processed and a fault appears to arise in the standby virtual adapter 61 from the OS 56. With this embodiment, this does not take place and the conventional operation is allowed to continue as is.

As means for realizing the foregoing fault correction function as described earlier, as shown in FIG. 2, the memory 21 of the management server 2 stores a control program group 24 which includes a distribution configuration program 70, a fault determination program 71, and a network topology collection program 72, and a management table group 25 which includes a physical server management table 73, a virtual server management table 74, an OS management table 75, a task and SLA management table 76, and a system management table 77. Furthermore, as shown in FIG. 4, the distribution mechanism 42 (FIG. 4) of the virtualization mechanism 40 (FIG. 4) of the physical server 4 saves a control program group 35 which includes a request detection program 80, a fault determination program 81, a management server communication program 82, and a distribution program 83, and a management table group 36 which includes an adapter management table 84 and a request type management table 85.

Among the above programs, the distribution configuration program 70 of the management server 2 is a program for configuring the distribution mechanism 42 of each physical server 4 regarding how to distribute requests from the virtual network interface 53. Furthermore, the fault determination program 71 is a program for receiving fault information from the physical servers 4 and virtual servers 55 which are management targets, the virtualization mechanism 40, the management network 3, the task network 5 and the storage subsystem 6. Well-known technologies can be applied as the procedure for detecting faults of the fault determination program 71.

Furthermore, the network topology collection program 72 is a program for collecting information relating to network-related configurations and connection relationships. Information collection work based on the network topology collection program 72 may be executed automatically or may be performed in response to a user operation. Well-known technologies can also be applied as the information collection procedure by the network topology collection program 72.

Meanwhile, the physical server management table 73 is a table which is used to manage the physical servers 4 which exist in the computer system 1 and, as shown in FIG. 7, is configured from a physical server identifier field 73A, a UUID field 73B, a physical adapter field 73C, a switch information field 73D, a server model field 73E, a configuration field 73F, and a performance information field 73G.

Among the above fields, the physical server identifier field 73A stores identifiers (hereinafter called physical server identifiers) which are assigned to the physical server 4 corresponding to the entry (equivalent to a single row in FIG. 7, similarly hereinbelow). A physical server identifier is an identifier which is unique to the physical server 4, and a MAC (Media Access Control) address or WWM (World Wide Name) or the like can be applied. However, as the physical server identifiers, identifiers obtained by combining information stored in any one field of the entries in the physical server management table 73 or information which is stored in any plurality of fields may be applied and the physical server identifiers may be allocated to the physical servers 4 automatically in ascending order.

Furthermore, the UUID field 73B stores UUIDs (Universal Unique IDentifiers) which are assigned to the physical servers 4. The UUID is an identifier whose format is predefined so that there is no overlap on a universal scale and, by managing the UUIDs for each of the physical servers 4, it is possible to guarantee the reliable unique characteristics of each of the physical servers 4. The UUIDs are identifiers which can also be candidates for the physical server identifiers and are very effective in server management spanning a wide range. However, the physical server identifiers are identifiers which enable the system administrator to identify the physical servers 4, and since there are no problems as long as there is no overlap between the physical servers 4, it is, although desirable, unnecessary to apply the UUIDs.

The physical adapter field 73C is a field for managing information relating to the physical adapters 60 installed in the physical servers 4 and is configured from a device field 73H, a WWN field 73I, and a status field 73J. Further, the device field 73H stores device IDs which are assigned to each of the physical adapters 60 installed in the corresponding physical servers 4. Note that, as types of physical adapters 60, there exist HBA (Host Bus Adaptor), NIC (Network Interface Card), and CAN (Converged Network Adapter) and the like. However, as shown in FIG. 7, if the "first HBA" is "HBA1" and the "first NIC" is "NIC1", device IDs are created which are obtained by adding serial numbers for each of the types of physical adapters 60 to character strings representing these types.

Furthermore, the WWN field 73I stores identifiers on the network of the physical adapters 60. For example, this field stores a WWN if the physical adapter 60 is a HBA, and stores a MAC address if the physical adapter 60 is a NIC. Furthermore, the status field 73J stores the current status of the physical adapter 60. The statuses of the physical adapter 60 include "normal", which represents a problem-free (no fault generated) state and "fault" which represents the fact that a fault has occurred.

The switch information field 73D stores information (switch types and identifiers, connection ports and security configuration information and the like) relating to switches on the management network 3 or task network 5 to which the physical server 4 is connected via the physical adapter 60.

The server model field 73E stores models of corresponding physical servers 4. This is infrastructure-related information and information enabling notification of performance and configurable system limits.

The configuration field 73F stores the configuration of the corresponding physical servers 4. More specifically, physical position information such as the architecture, chassis, and slots and the like of the CPU 30 (FIG. 3) installed in the physical servers 4, as well as information related to feature functions (regarding whether interblade SMP (Symmetric Multi-Processing) and HA configuration and the like exist). The information which is stored in the configuration field 73F is infrastructure-related information which is similar to information that is stored in the server model field 73E.

In addition, the performance information field 73G stores performance information of the corresponding physical servers 4. More specifically, the processing speed and number of cores of the CPU 30, the memory capacity, hard disk capacity, and the communication speeds of the NIC and HBA and the like are stored in the performance information field.

The virtual server management table 74 is a table for managing the virtual servers 55 which exist in the computer system 1, and, as shown in FIG. 8, is configured from a virtual server identifier field 74A, a UUID field 74B, an I/O device field 74C, a virtualization type field 74D, and a performance information field 74E.

Among these, the virtual server identifier field 74A stores identifiers (hereinafter called virtual server identifiers) which are allocated to the virtual servers 55 corresponding to the entries. The virtual server identifiers are identifiers which are unique to the virtual servers 55 and a virtual MAC address or virtual WWN or the like, for example, can be applied. Furthermore, because identifiers for uniquely preserving the uniqueness are sometimes adopted by the OS 56, the virtual server identifier of the virtual server 55 where the OS 56 is installed may also be generated by partially using this identifier. In addition, in order to ensure the uniqueness, the virtual server identifiers may also be generated by means of a unique method other than that described above.

The UUID field 74B stores UUIDs which are assigned to the virtual servers 55. The UUIDs are identifiers which can also serve as candidates for the virtual server identifiers and are identifiers which are very effective in server management over a wide range. However, the virtual server identifiers are identifiers enabling the system administrator to identify the virtual servers 55, and since there are no problems as long as there is no overlap between the virtual servers 55, it is, although desirable, unnecessary to apply the UUIDs.

The I/O device field 74C is a field for managing information relating to virtual adapters 61 installed on the virtual servers 55 and is configured from a virtual device field 74F, a virtual WWN field 74G, a current/standby field 74H, a mode field 74I, and a security field 74J.

Further, the virtual device field 74F stores device IDs which are assigned to each of the virtual adapters 61 configured in the corresponding virtual servers 55. Note that, FIG. 8 illustrates a case where device IDs are assigned which are obtained by adding serial numbers for each of the types of virtual adapters 61 to character strings representing these types in a state where the "first virtual HBA" is "vHBA" and the "first NIC" is "vNIC1". Furthermore, the virtual WWN field 74G stores identifiers on the network of the virtual adapter 61. For example, this field stores a virtual WWN if the virtual adapter 61 is a virtual HBA and stores a virtual MAC address if the virtual adapter 61 is a virtual NIC.

In addition, the current/standby field 74H stores information indicating whether the corresponding virtual adapter 61 is in the current system or in the standby system. More specifically, if the virtual adapter 61 is the "first" adapter of the current system, the information stored is "current 1," and if the virtual adapter 61 is the "second" adapter of the standby system, the information stored is "standby 2."

Furthermore, the mode field 74I stores the usage mode of the virtual adapter 61. Usage modes include "occupancy" in which the virtual adapter 61 occupies and uses the physical adapter 60 associated with the virtual adapter 61 and "shared" in which the virtual adapter 61 shares usage, with another virtual adapter 61, of the physical adapter 60 associated with the virtual adapter 61. In addition, the security field 74J stores security-related configuration information of the virtual adapter 61.

In addition, the virtualization type field 74D stores information relating to the virtualization types of the virtual servers 55. The virtualization types indicate virtualization products and virtualization technology, and make it possible to reliably discriminate control interfaces and performance differences. Information relating to virtualization types may include version information and, if a virtual server independently possesses a management function, may also include the name of the management function and management interface.

Furthermore, the performance information field 74E stores performance information on the corresponding virtual servers 55. The performance information includes the operating frequency and number of cores of the virtual CPU 50 (FIG. 3) and includes the memory capacity of the virtual memory 51 (FIG. 3), the disk capacity of the virtual hard disk drive and the communication speeds of the virtual adapters 61, and the like.

The OS management table 75 is stored in the memory 31 (FIG. 3) of the physical servers 4 and is for managing the OS which is used as the OS 56 in the virtual server 55 and, as shown in FIG. 9, is configured from an OS identifier field 75A, a UUID field 75B, an OS type field 75C, an OS configuration information field 75D, and a redundancy field 75E.

Furthermore, the OS identifier field 75A stores identifiers (hereinafter called OS identifiers) which are unique to the OS assigned to the OS corresponding to the entries. Note that, as OS identifiers, the OS configuration information stored in the OS configuration information field, for example, may also be applied. Further, the UUID field 75B stores the UUIDs assigned to the OS. However, the OS identifiers are identifiers enabling the system administrator to discriminate between the OS, and since there are no problems as long as there is no overlap between the OS, it is, although desirable, unnecessary to apply the UUIDs.

Further, the OS type field 75C stores the OS types. In addition, the OS configuration information field 75D stores OS configuration information which is configured for the OS such as IP addresses, host names, IDs, passwords and disk images. Note that disk images refers to the disk images of system disks with which pre- and post-configuration OS are distributed to the physical servers 4 and virtual servers 55. However, a data disk may also be included in a disk image. In addition, the redundancy field 75E stores information relating to the redundancy configured for the OS.

The task and SLA management table 76 is a table for managing information relating to tasks executed by the virtual servers 55 operating on the physical servers 4 and, as shown in FIG. 10, is configured from a task identifier field 76A, a UUID field 76B, a task type field 76C, a task configuration information field 76D, and a priority ranking SLA field 76E.

Among these, the task identifier field 76A stores identifiers (hereinafter called task identifiers) which are assigned to the tasks corresponding to the entries. As task identifiers, the task configuration information stored in the task configuration information field, for example, may also be applied.

Furthermore, the UUID field 76B stores UUIDs which are assigned to the tasks. The UUIDs are identifiers which can also be candidates for the task identifiers and are very effective in tasks spanning a wide range. However, the task identifiers are identifiers which enable the system administrator to identify the tasks, and since there are no problems as long as there is no overlap between the tasks, it is, although desirable, unnecessary to apply the UUIDs.

The task type field 76C stores, as information relating to task types, information relating to software which specifies tasks such as the applications and middleware used. Furthermore, the task configuration information field 76D stores, as information relating to items configured for the tasks, logical IP addresses, IDs, passwords, and disk images used by the tasks, and port numbers and the like used by the tasks. Note that disk images refers to the disk images of system disks with which pre- and post-configuration tasks are distributed to the physical servers 4 or virtual servers 55. However, a data disk may also be included in a disk image.

In addition, the priority ranking and SLA field 76E stores the priority rankings of the tasks between each of the tasks registered in the task and SLA management table 76 as well as the requirements (SLA: Service Level Agreement) configured for the tasks. Accordingly, if, based on the information stored in the priority ranking and SLA field 76E, it is necessary, to some degree, for a particular task to be rescued as a priority, it is possible to determine whether it is possible for the computer resources to be shared with another task in shared mode. As described earlier, in the computer system 1 according to this embodiment, since the computer resources of the standby system are shared, the extent to which the resources can be shared must be configured and it is possible to determine an operation which enables the effects of the present invention to be obtained to the greatest possible extent (to determine how much the standby physical computer resources are reduced).

The system management table 77 is a table for managing system configurations which are a combination of the physical servers 4, the virtual servers 55, the OS 56, and the tasks. By managing such systems, the distribution configuration which is configured for the distribution mechanism, described subsequently, according to system priority rankings can be changed according to tasks and SLA. As shown in FIG. 11, the system management table 77 is configured from a system identifier field 77A, a UUID field 77B, a physical server field 77C, a virtual server field 77D, an OS field 77E, and a task field 77F.

Further, the system identifier field 77A stores system-unique identifiers (hereinafter called system identifiers) which are assigned to the systems corresponding to the entries. In addition, the UUID field 77B stores UUIDs which are assigned to the systems. UUIDs may be applied which are obtained by applying part or all of the information stored in each of the fields, from the physical server field 77C to the task field 77F.

The physical server field 77C, the virtual server field 77D, the OS field 77E, and the task field 77F store the physical server identifiers of the physical servers 4 which the system comprises, the virtual server identifiers of the virtual servers 55, the OS identifiers of the OS 56, and the task identifiers of the tasks, respectively.

Note that, although not shown in FIG. 11, the system management table 77 may also manage the existence of racks, floors, component boxes, breakers, centers, and HA configurations associated with each of the systems, network infrastructure information, power grids, network connection relationships, and information relating to network switches, fibre channel switches, capacities of each switch, and network bandwidths and the like, and thus, the effects of the present invention can also be obtained for system availability.

Meanwhile, the request detection program 80 (FIG. 4) of the physical servers 4 is a program for detecting the fact that a request has been issued by the virtual server 55 operating on the virtualization mechanism 40, and the fault determination program 81 is a program for determining whether or not a fault has occurred in the network interface 33 of the physical servers 4 when a request is supplied to the virtualization mechanism 40 from the virtual servers 55.

Furthermore, the management server communication program 82 is a program enabling the distribution mechanism 42 to communicate with the management server 2 via the virtualization mechanism management interface 41, and the distribution program 83 is a program for distributing requests issued from the virtual adapters 61 to the corresponding physical adapters 60 in accordance with the determination result of the fault determination program 81.

The adapter management table 84 of the physical servers 4 is a table for managing the virtual adapters 61 installed in each of the virtual servers 55 and, as shown in FIG. 12, is configured from a virtual server identifier field 84A, a virtual adapter field 84B, a current/standby field 84C, a mode field 84D, a security field 84E, a security type field 84F, a physical adapter field 84G, and a status field 84H.

Furthermore, the virtual server identifier field 84A, the virtual adapter field 84B, the current/standby field 84C, the mode field 84D, and the security field 84E respectively store the same information as the information which is stored in the corresponding fields among the virtual server identifier field 74A, the virtual device field 74F, the current/standby field 74H, the mode field 74I, and the security field 74J in the virtual server management table 74 which was described earlier with reference to FIG. 8. Furthermore, the security type field 84F stores specific security-related types which are stored in the corresponding security field 84E.

Furthermore, the physical adapter field 84G stores the adapter IDs of the physical adapters 60 to which the corresponding virtual adapters 61 have been allocated. Note that, if the physical adapters 60 are allocated to the virtual adapters 61 which are configured in occupancy mode, the adapter IDs of the physical adapters 60 are not stored in the physical adapter field 84G of the other virtual adapters 61. If, on the other hand, the physical adapters 60 are allocated to the virtual adapters 61 configured in shared mode, the adapter IDs of the physical adapters 60 are indeed stored in the physical adapter field 84G of the other virtual adapters 61.

The status field 84H stores information relating to the statuses of the corresponding virtual adapters 61 or physical adapters 60. In this case, such statuses include "normal" which signifies a state where a fault has not occurred and "fault" which means a fault has occurred, or the like. Further, other information relating to status includes the fact that "the virtual adapter 61 of the standby system uses a certain physical adapter 60 (NIC 5 assumed) at high priority" or "the virtual adapter 61 of the standby system makes shared usage of the physical adapter 60." The status-related information includes either or both of content which is ascertained and determined by the virtualization mechanism 40 or content which is configured, ascertained, and ordered by the management server 2.

The request type management table 85 is a table for managing types of requests which are issued by the physical adapter 60 or the virtual adapter 61 or issued to the physical adapters 60 or the virtual adapters 61, and manages rules for distribution operations which are executed by the distribution mechanism 42 in response to the requests. As shown in FIG. 13, the request type management table 85 is configured from a request identifier field 85A, a request type field 85B, and a distribution instruction field 85C.

Furthermore, the request identifier field 85A stores identifiers (hereinafter called request identifiers) which are assigned to the requests corresponding to the entries, and the request type field 85B stores types of corresponding requests (hereinafter simply called request types). The "request types" include "vital monitoring," "multicast," and "unicast."

Further, the distribution instruction field 85C stores the processing content of distribution processing which is to be executed for the request types by the distribution mechanism. In the case of the example in FIG. 13, for example, when an ARP (Address Resolution Protocol) request is issued by the virtual adapter 61 as "vital monitoring," the processing such as that described hereinbelow is executed.

The distribution mechanism 42 first searches among the physical adapters 60 of the standby system for physical adapters 60 which have not been configured for high priority usage by another virtual adapter 61 and, if such a physical adapter 60 exists, distributes an ARP request to the physical adapter 60 ("processing by another standby physical adapter" in FIG. 13).

If, on the other hand, there is no physical adapter 60 of the standby system which has not been configured for high priority usage by the virtual adapter 61 as described above, the distribution mechanism 42 issues an inquiry to the management server 2 to inquire after a physical adapter 60 of the standby system which is charged with a low priority ranking task and, if such a physical adapter 60 exists, distributes the ARP request to the physical adapter 60 ("processing by a low priority ranking adapter if not mentioned earlier" in FIG. 13).

Furthermore, if there is no physical adapter 60 in the standby system which is charged with a low priority ranking task as described above, the distribution mechanism 42 issues an inquiry to the management server 2 to inquire after a low load physical adapter 60 and, if such a physical adapter 60 exists, the distribution mechanism 42 distributes the ARP request to the physical adapter 60 ("processing by the low load adapter if the foregoing does not apply" in FIG. 13).

Note that if there is no low load physical adapter 60 as described above, the distribution mechanism 42 may place the physical adapters 60 of the current system, which are being used in occupancy mode, into shared mode, and may distribute the ARP request to the physical adapter 60.

Further, if a physical adapter 60 for distributing ARP requests ultimately cannot be found, the distribution mechanism 42 does not pass an ARP request, that is, the distribution mechanism 42 notifies the management server 2 that there is no physical adapter 60 which is a distribution destination of the ARP request ("not passed" in FIG. 13).

Note that, irrespective of the existence of a fault in the physical adapter 60 which is allocated to the virtual adapter 61 of the current system, various management packets other than a vital monitoring request are issued by the virtual adapters 61 of the standby system in each of the virtual servers 55. In this case, since the packet size of the management packet is small, the request distribution destination can also be determined depending on the packet size of the request (see the distribution instruction field 85C of the "request identifier 6" and the distribution instruction field 85C of the "request identifier 7" in FIG. 13). As a result, determination is rapid and it is also possible to cope with management packets other than a vital monitoring request.

(1-3) Various Processing Relating to Distribution Processing According to this Embodiment (1-3-1) Request Distribution Processing The specific processing content of various processing relating to distribution processing according to this embodiment will be described next. Note that, although a case is described hereinbelow in which the processing subject of the various processing is the "program," it goes without saying that, in reality, this processing is executed, based on this program, by the CPU 20 of the management server 2 or the CPU 30 of the physical server 4.

Figure 14:
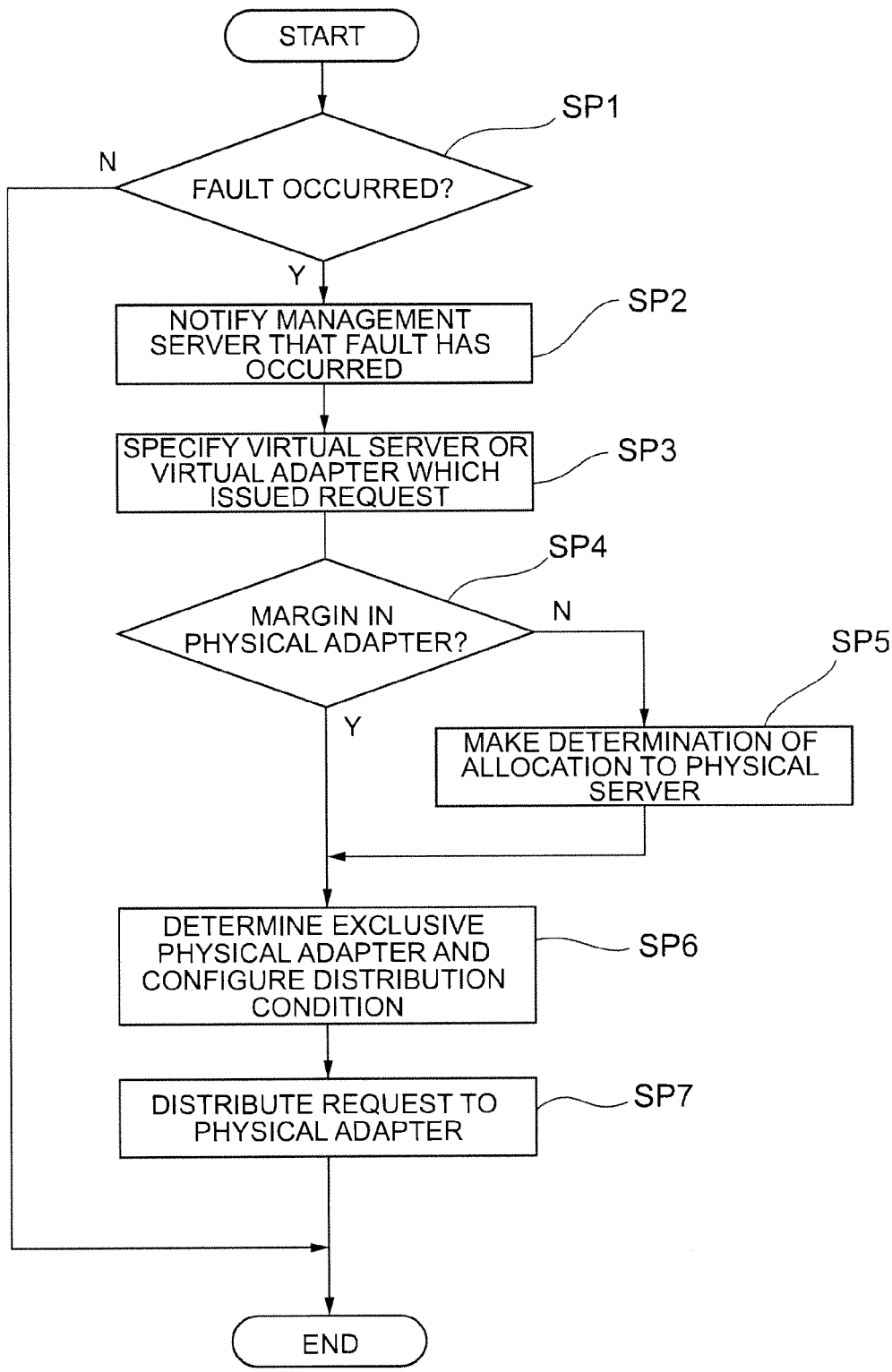
FIG. 14 is a flowchart showing a processing routine for request distribution processing.

FIG. 14 shows the flow of a series of distribution processing which is executed by the control program group 35 of the virtualization mechanism 40 of the physical servers 4 in connection with the distribution processing.

In this control program group 35, the request detection program 80 (FIG. 4) stands by to receive a request issued by the virtual adapter 61 of the standby system of any virtual server 55 operating on its own physical server 4. Further, when the request detection program 80 detects the fact that any request has been issued by the virtual adapter 61 of the standby system of any virtual server 55, the fault determination program 81 (FIG. 4) then determines by way of response whether or not a fault has occurred in the physical adapter 60 allocated to the virtual adapter 61 (SP1).

Here, obtaining a negative result (that a fault has not occurred) in this determination means that the request detected by the request detection program 80 at the time is a vital monitoring request or another management request. Thus, the fault determination program 81 then hands over the request to the distribution program 83. The distribution program 83 then executes distribution processing which is described subsequently with reference to FIG. 16 (SP7).

On the other hand, obtaining an affirmative result (fault has occurred) in the determination of step SP1 means that a fault has occurred in the physical adapter 60 allocated to the virtual adapter 61 of the current system of the virtual server 55 which issued the request at the time. Thus, the fault determination program 81 then transmits notification to that effect to the management server 2 via the management server communication program 82 (FIG. 4) (SP2).

Furthermore, the fault determination program 81 subsequently refers to the adapter management table 84 (FIG. 12), specifies the virtual adapter 61 which issued the request in the virtual server 55 which issued the request (SP3), and determines whether or not there is an excess in the physical adapter 60 of the standby system (whether there is a physical adapter 60 in the standby system which has not been configured as a physical device which is also used at high priority by the virtual adapter 61 of the standby system of any of the virtual servers 55) (SP4).

Furthermore, if it is determined that there is no surplus in the physical adapter 60 of the standby system, the fault determination program 81 issues an inquiry to the management server 2 to inquire after the physical adapter 60 in the standby system which is to distribute this request by transmitting notification to that effect (hereinafter referred to as a determination request notification) to the management server 2 (SP5). Upon receiving this determination request notification, the management server 2 accordingly determines whether to allocate a particular physical adapter 60 to the virtual adapter 61 which issued the request in accordance with distribution destination determination processing, described subsequently, with reference to FIG. 17, and notifies the fault determination program 81 of a distribution condition, described subsequently, which is a determination result.

Here, the distribution condition is information which includes candidates for the physical adapter 60 allocated to the virtual adapter 61 which issued the request as described earlier. Candidates for the physical adapter 60 allocated to the virtual adapter 61 which issued the request include the physical adapter 60 in the standby system allocated to the virtual adapter 61 of the virtual server 55 which executes the task with the lowest priority ranking, and the physical adapter 60 in the standby system allocated to the virtual adapter 61 with the lowest load and/or for which a low load state is ongoing, for example. A determination that a physical adapter 60 is not allocated can also be made in cases where all the physical adapters 60 in the standby system have been allocated to the virtual adapters 61 of the other virtual servers 55 executing tasks at high priority ranking or when SLA requirements are not satisfied.

Further, upon receiving the foregoing distribution condition transmitted from the management server 2, the fault determination program 81 determines the physical adapter 60 allocated to the virtual adapter 61 which issued the request of the virtual server 55 which issued the request, refers to the request type management table 85, and configures the distribution program 83 with a distribution condition for when a request is to be distributed to the physical adapter 60. In addition, the fault determination program 81 transfers the request to the distribution program 83 (SP6).

Thus, the distribution program 83 distributes a request which is transferred from the fault determination program 81 to the corresponding physical adapter 60 in accordance with the distribution condition configured in step SP6 and the processing method for each request type defined in the request type management table 85 (FIG. 13) (SP7).

As a result, a series of request distribution processes in the control program group 35 of the physical server 4 are completed.

(1-3-2) Fault Determination Processing

Figure 15:
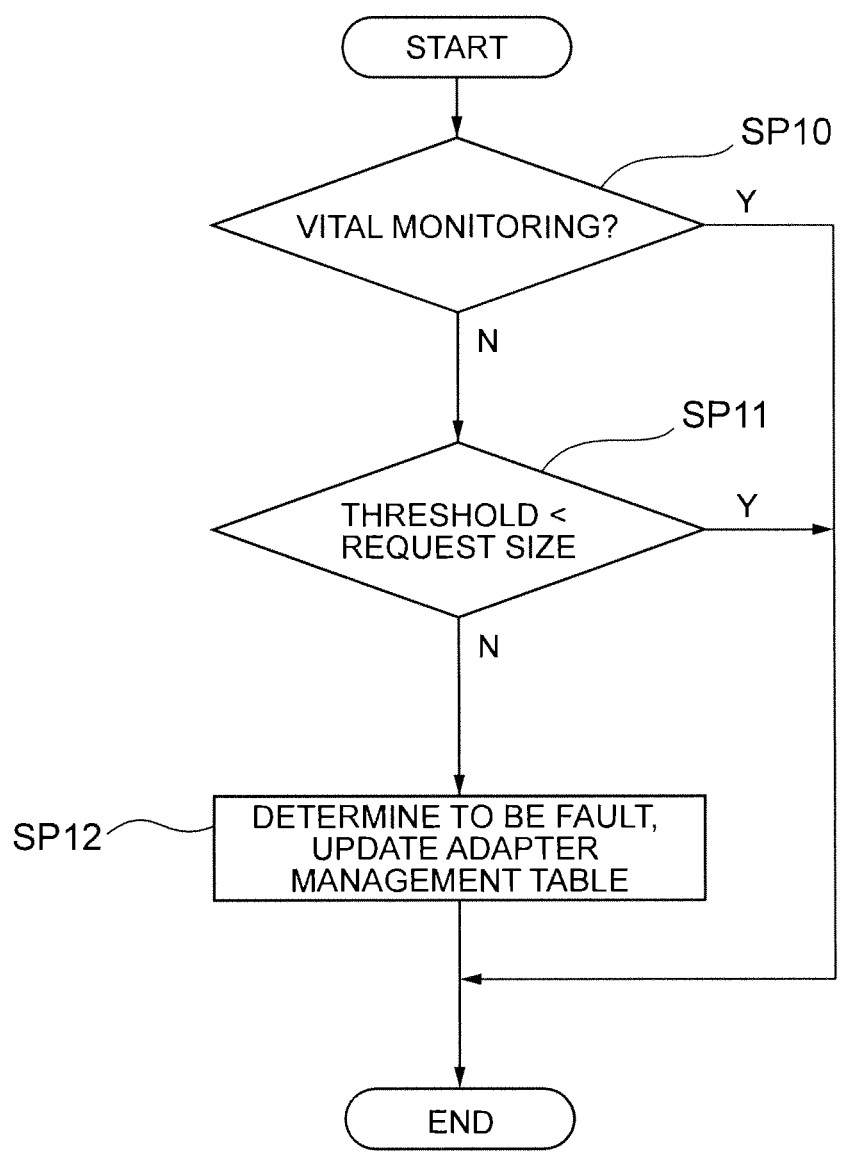
FIG. 15 is a flowchart showing a processing routine for fault determination processing.

Meanwhile, FIG. 15 shows a specific processing routine of fault determination processing which is executed by the fault determination program 81 in step SP1 of FIG. 14. FIG. 15 is an example of a case in which the request detection program 80 determines that a fault has not occurred when a received request is a vital monitoring request or a request with a packet size equal to or less than a predetermined threshold (hereinafter called a management packet determination threshold), and in which the fault determination program 81 otherwise determines that a fault has occurred.

That is, when the request detection program 80 detects a request from any of the virtual adapters 61, the fault determination program 81 starts the fault determination processing and first determines whether or not the request is a vital monitoring request (SP10). Furthermore, upon obtaining an affirmative result in the determination, the fault determination program 81 ends the fault determination processing and advances to step SP7 of the request distribution processing described earlier with reference to FIG. 14.

If, on the other hand, a negative result is obtained in the determination of step SP10, the fault determination program 81 determines whether or not the size of the request is greater than the foregoing management packet determination threshold (SP11).

Upon obtaining an affirmative result in the determination, the fault determination program 81 determines that a fault has occurred and updates the status stored in the status field 84H (FIG. 12) of the corresponding entry in the adapter management table 84 (FIG. 12) (SP12). Further, the fault determination program 81 completes the fault determination processing and advances to step SP2 of the request distribution processing described earlier with reference to FIG. 14.

If, on the other hand, a negative result is obtained in the determination of step SP11, the fault determination program 81 determines that a fault has not occurred and completes the fault determination processing and advances to step SP7 of the request distribution processing.

(1-3-3) Distribution Processing

Figure 16:
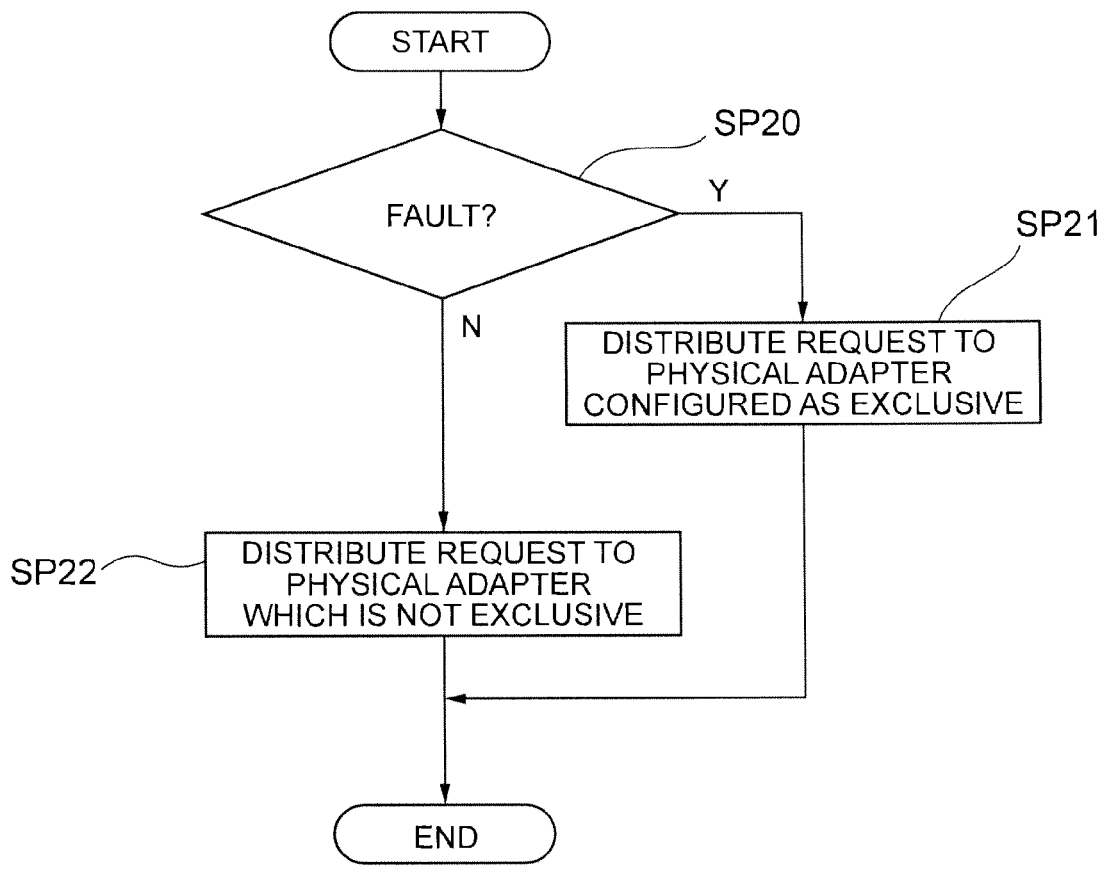
FIG. 16 is a flowchart showing a processing routine for distribution processing.

Meanwhile, FIG. 16 shows a specific processing routine for distribution processing which is executed by the distribution program 83 in step SP7 in FIG. 14.

When a request from any of the virtual adapters 61 is supplied from the fault determination program 81, the distribution program 83 starts the distribution processing and first refers to the adapter management table 84 and determines whether or not the status of the distribution destination physical adapter 60 is "fault."

Furthermore, upon obtaining the affirmative result in the determination, the distribution program 83 distributes the request to the physical adapter 60 configured for high priority usage in step SP6 of FIG. 14 (SP21). Furthermore, the distribution program 83 subsequently completes the distribution processing.

However, upon obtaining a negative result in the determination of step SP20, the distribution program 83 distributes a request to any standby-system physical adapter 60 which has not been configured also for high priority usage by any of the virtual adapters 61 among the standby-system physical adapters 60 (SP22). Further, the distribution program 83 then completes the distribution processing.

(1-3-4) Distribution Configuration Processing

Figure 17:
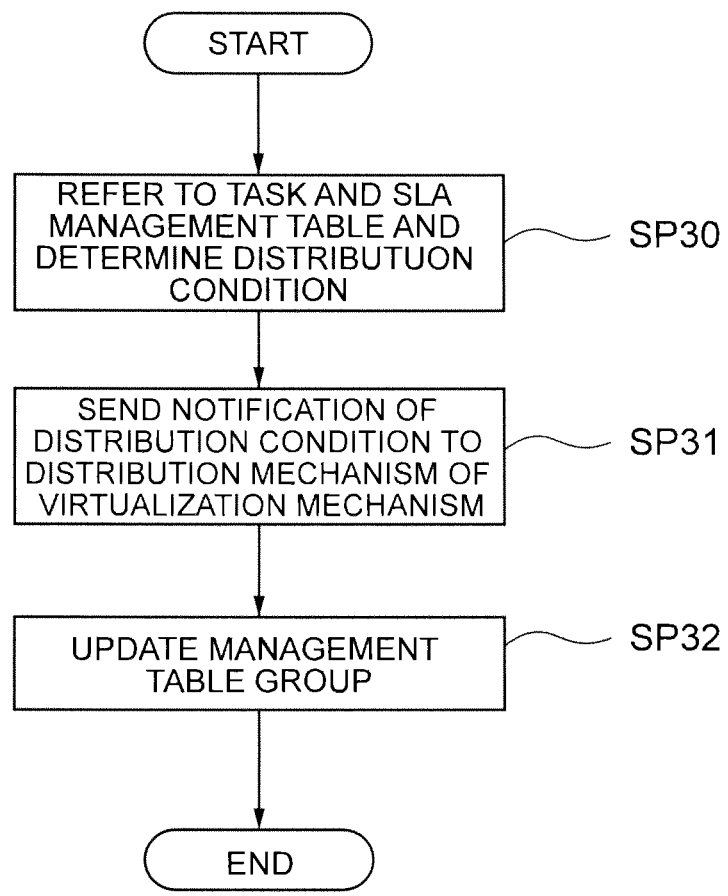
FIG. 17 is a flowchart showing a processing routine for distribution configuration processing.

FIG. 17 shows a processing routine for distribution configuration processing which is executed by the distribution configuration program 70 (FIG. 2) of the management server 2 which receives the determination request notification from the virtualization mechanism 40 of the physical servers 4.

Upon receiving the determination request notification, the distribution configuration program 70 starts the distribution configuration processing and first refers to the task and SLA management table 76 (FIG. 2) and determines, from the priority ranking and the usage amount and usage frequency of the computer resources and so on, a set of the virtual adapter 61 which issued the request at the time and a virtual adapter 61 which is to share the physical adapter 60 (hereinafter called the distribution condition) from among the virtual adapters 61 which have already been allocated for high priority usage by the physical adapter 60 (SP30).

Methods for determining the distribution condition include, for example, a method of combining a virtual adapter 61 of the virtual server 55 which executes tasks with a high priority ranking and a virtual adapter 61 of the virtual server 55 which executes tasks with a low priority ranking, a method of combining a virtual adapter 61 of the virtual server 55 which executes tasks with a high computer resource usage amount and high usage frequency with a virtual adapter 61 of the virtual server 55 which executes tasks with a low computer resource usage amount and a low usage frequency, and a method of combining only the virtual adapters 61 of the virtual servers 55 which execute best effort tasks.

Furthermore, a method of determining the distribution method may also be considered so that the allocation mode of the physical adapter 60 allocated to a certain current-system virtual adapter 61 is changed from occupancy mode to shared mode and the physical adapter 60 is allocated to the virtual adapter 61 which issued the request. At this time, a physical adapter 60 with a low utilization rate and usage frequency are targeted as the physical adapter 60. Further, a method of securing some capacity from physical adapters 60 allocated to current-system virtual adapters 61 of the virtual server 55 which execute tasks during slow periods at non-busy times may also be considered. A method in which a physical adapter 60 is not allocated to the virtual adapter 61 if such a physical adapter 60 does not exist may also be considered.

The distribution configuration program 70 then notifies the distribution mechanism 42 of the virtualization mechanism 40 of the distribution condition configured as described earlier (SP31) and, where necessary, updates the physical server management table 73 and/or the virtual server management table 74 which the management table group 25 stored in the memory 21 of the management server 2 comprises (SP32).

The distribution configuration program 70 subsequently terminates the distribution configuration processing.

(1-4) Advantageous Effects of Embodiment

As mentioned earlier, in the computer system 1 according to the embodiment, if all the standby-system physical adapters 60 are allocated in a configuration for high priority usage by any of the virtual adapters 61, a gap in the processing of the standby-system physical adapter 60 of a high priority is found in order to slot in requests of the other virtual adapters 61, and hence tasks executed by the virtual server 55 can be rescued without affecting tasks other than tasks executed by virtual servers 55 to which a physical adapter 60 with a fault is allocated. Accordingly, a high availability computer system with which a greater number of tasks can be rescued while maintaining performance as much as possible can be realized.

(2) Second Embodiment

According to the first embodiment, when the fault determination program 71 ascertains that there is no surplus in the physical adapter 60 in step SP4 of the request distribution processing described earlier with reference to FIG. 14, the management server 2 determines the physical adapter 60 for slotting in the requests, but the distribution mechanism 42 of the physical server 4 may also perform part of this determination.

In other words, this is a method whereby, when the fault determination program 71 ascertains that there is no surplus in the physical adapter 60 in step SP4 of the request distribution processing, the distribution mechanism 42 determines the request type of the request from the virtual adapter 61, and causes a physical adapter 60 with a margin to slot in this request when the request processing load is light or when there is a margin for slotting in processing such as when there is unused area in the standby-system physical adapter 60 which has been configured for high priority usage by any of the virtual adapters 61.

With this method, similarly to the first embodiment, highly important tasks can be prevented from stopping even in cases where, in a state where there is no surplus in the standby-system physical adapter 60, a fault occurs in the physical adapter 60 allocated to the current-system virtual adapter 61 of the virtual server 55 charged with highly important tasks.

As scenarios where this method can be adopted, consideration may be paid to cases where there is a vital monitoring request issued by the other virtual adapter 61, where there is an amount of requests below a threshold pre-configured by the user, or where no deterioration in performance is produced in view of the bandwidth usage amount of the virtual adapter 61 used at high priority (for example, a threshold is configured, the response time is measured by a monitoring program or the like, and there is no SLA violation, and so on). By dealing with the foregoing cases, tasks other than the task of relaying processing using a standby-system physical adapter 60 can also be rescued. In addition, since there is no need to increase the physical adapters 60, it is possible to "provide a high availability system in a virtualization environment at low cost" which is the effect of the present invention.

Figure 18:
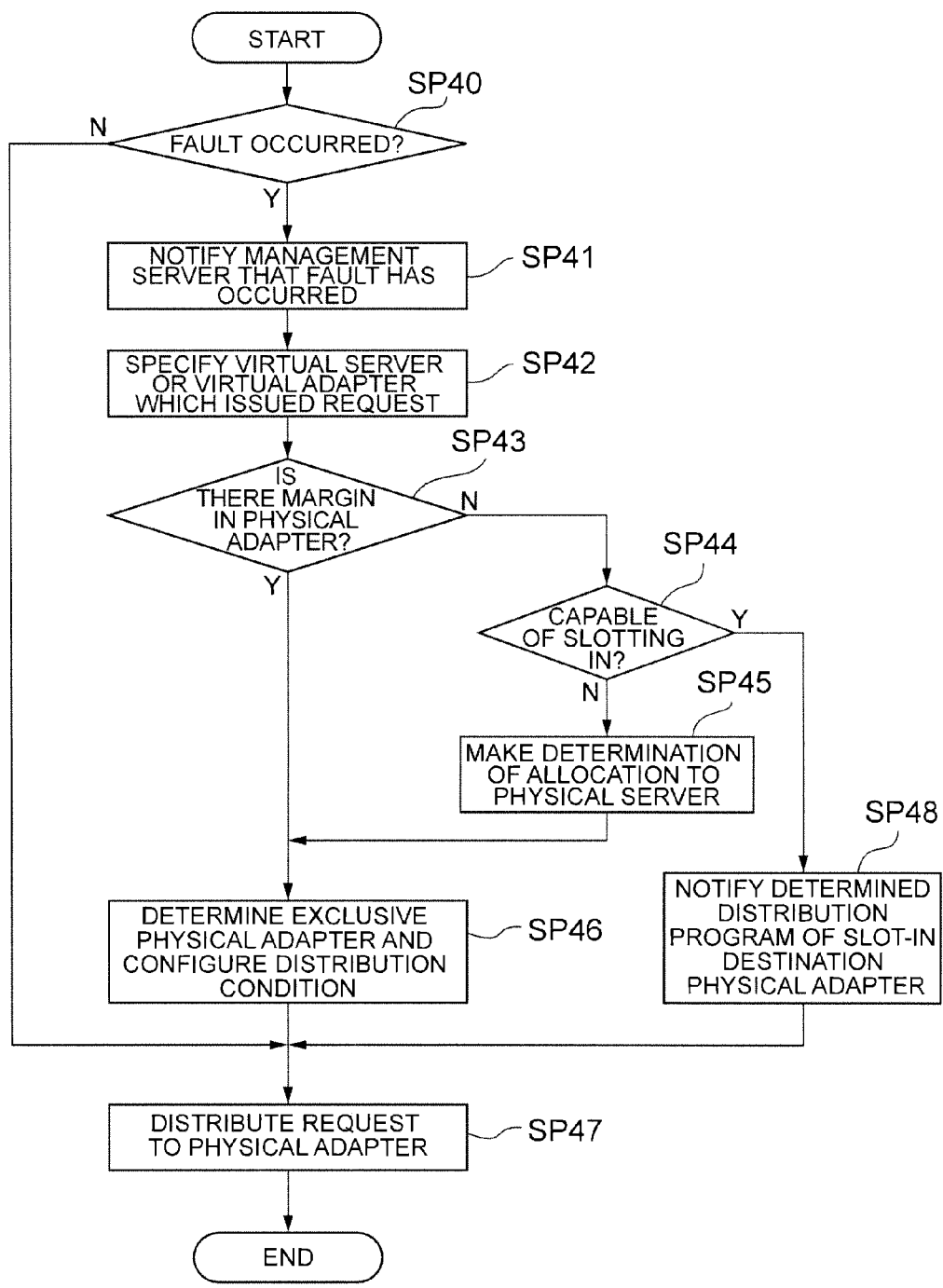
FIG. 18 is a flowchart showing a processing routine for request distribution processing according to a second embodiment.

FIG. 18 shows a processing routine for request distribution processing according to the second embodiment which considers the foregoing. In the case of this embodiment, the distribution mechanism 40 of the physical server 4 processes the processing of steps SP40 to SP43 in the same way as steps SP1 to SP4 of the request distribution processing according to the first embodiment described earlier with reference to FIG. 14.

Furthermore, if an affirmative result is obtained in the determination of step SP43, the processing of steps SP46 to SP47 subsequently performs the same processing as that of steps SP6 and SP7 of the request distribution processing according to the first embodiment and then a series of request distribution processes in the control program group 35 of the physical servers 4 is completed.

If, on the other hand, a negative result is obtained in the determination of step SP43, the fault determination program 81 refers to the adapter management table 84 (FIG. 12) and the request type management table 85 (FIG. 13) and determines whether there is a physical adapter 60 capable of slotting in the requests among the standby-system physical adapter 60 configured for high priority usage by any of the virtual adapters 61 (SP44). More specifically, the fault determination program 81 makes this determination by considering the request processing load and whether or not there is an unused area in the standby-system physical adapter 60 configured for high priority usage by any of the virtual adapters 61.

Upon obtaining an affirmative result in this determination, the fault determination program 81 determines the physical adapter 60 for slotting in the requests, takes the determined physical adapter 60 as the request distribution destination, and notifies the distribution program 83, and transfers the request to the distribution program 83 (SP48).

If, on the other hand, a negative result is obtained in the determination of step SP44, the fault determination program 81 issues an inquiry to the management server 2 to inquire after a standby-system physical adapter 60 for distributing the request by transmitting a determination request notification for the management server 2 to the management server 2 (SP45). Thus, upon receiving the determination request notification, the management server 2 determines which physical adapter 60 to allocate to the virtual adapter 61 which issued the request in the same way as in the first embodiment, takes the determination result as the distribution condition, and notifies the fault determination program 81.

Upon receipt of the foregoing distribution condition transmitted from the management server 2, the fault determination program 81 determines the physical adapter 60 allocated to the virtual adapter 61 which issued the request of the virtual server 55 which issued the request, refers to the request type management table 85, and configures the distribution program 83 with the distribution condition for when to allocate a request to the physical adapter 60. The fault determination program 81 transfers the request to the distribution program 83 (SP46).

Accordingly, the distribution program 83 distributes the request transferred from the fault determination program 81 at the time to the corresponding physical adapter 60 according to distribution conditions configured in step SP6 and the processing method for each request type defined in the request type management table 85 (FIG. 13) (SP47).

The series of request distribution processes of the control program group 35 of the physical servers 4 is then completed.

As mentioned earlier, according to this embodiment, although there is no surplus in the physical adapter 60, a physical adapter 60 with a margin is made to slot in this request when the request processing load is light or when there is a margin for slotting in processing such as if there is unused area in the standby-system physical adapter 60 which has been configured for high priority usage by any of the virtual adapters 61, and hence, as per the first embodiment, a task executed by the virtual server 55 can be rescued without affecting tasks other than the tasks which are executed by the virtual server 55 to which the physical adapter 60 with the fault has been allocated. Thus, a high availability computer system with which a greater number of tasks can be rescued while maintaining performance as much as possible can be realized.

(3) Third Embodiment

A plurality of tasks which the system comprises can be rescued equally, for example, by grouping the standby-system virtual adapters 61 and performing priority rankings for each group. Because tasks other than these tasks are rescued rather than a certain task alone being rescued as a priority, the system can be rescued. In such a case, rescuing one alone is usually insufficient, and rescuing another at the same time signifies a redundant configuration. The foregoing effects can be obtained by using, as group types, individually or combined, computer system types such as a user type, a role type, a task type, an application type, an OS type, a VM type, and a hardware type, and items similar to operations of a computer system. Type-related information is stored in the management table group 25 or the management table group 36.

(4) Fourth Embodiment

When a fault is generated, the port of an external switch (connected to the management network 3 or the task network 5, for example) to which the standby-system physical adapter 60 is connected is changed to a specific configuration (security configuration or the like, for example) and the port configuration (security configuration or the like, for example) to which the current physical adapter 60 is connected is acceded. The management server 2 may issue the instruction or the distribution mechanism 42 may issue the instruction. As a result, the same security strength as that of the current physical adapter 60 can be realized, the same performance can be achieved by executing a QoS (Quality of Service) configuration, and a normal connection can be established by implementing a VLAN (Virtual Local Area Network) configuration or SAN security configuration.

(5) Further Embodiments

Note that, although a case was described in the foregoing embodiments in which the present invention is applied to the computer system 1 configured as illustrated in FIG. 1, the present invention is not limited to such a case, rather, the present invention can be widely applied to computer systems with various other configurations in which virtual devices are multiplexed with the object of establishing redundancy.

Furthermore, although only a case was described in the foregoing embodiments in which a standby-system physical adapter 60 is allocated to the standby-system virtual adapter 61 of the virtual server 55 in which a fault has occurred in the physical adapter 60 allocated to the current-system virtual adapter 61, when a fault occurs in the standby-system physical adapter 60, for example, yet another standby-system physical adapter 60 may be allocated to the standby-system virtual adapter 61 as a high priority usage physical adapter.

INDUSTRIAL APPLICABILITY

The present invention can be widely applied to computer systems with various other configurations in which virtual devices are multiplexed with the object of establishing redundancy.

REFERENCE SIGNS LIST

1 Computer system
2 Management server
3 Management network
4 Physical server
5 Task network
6 Storage subsystem
20, 30 CPU
21, 31 Memory
22, 33 Network interface
23, 34 Disk interface
24, 35 Control program group
25, 36 Management table group
40 Virtualization mechanism
42 Distribution mechanism
53 Virtual network interface
54 Virtual disk interface
55 Virtual server
60 Physical adapter
61 Virtual adapter
70 Distribution configuration program
71 Fault determination program
72 Network topology collection program
73 Physical server management table
74 Virtual server management table
75 OS management table
76 Task and SLA management table
77 System management table
80 Request detection program
81 Fault determination program
82 Management server communication program
83 Distribution program
84 Adapter management table
85 Request type management table

The invention claimed is:
1. A computer system comprising at least one physical server,
wherein the at least one physical server comprises:
current-system physical devices;
standby-system physical devices; and
a virtualization mechanism which provides a plurality of virtual servers each comprising a current-system virtual device obtained by virtualizing the current-system physical devices, and a standby-system virtual device obtained by virtualizing the standby-system physical devices,
wherein the virtualization mechanism is configured to:
allocate, for occupied usage, the current-system physical devices to the current-system virtual devices of each of the plurality of virtual servers; and
allocate, for shared usage, the standby-system physical devices to the standby-system virtual devices of the plurality of virtual servers,
wherein, when a fault occurs in a first current-system physical device allocated to a first current-system virtual device of a first virtual server,
the virtualization mechanism is configured to:
configure a first standby-system physical device, which has not been configured as a physical device which is used at high priority by any of the standby-system virtual devices of the plurality of virtual servers, as a physical device which is used at a high priority by a first standby-system virtual device of the first virtual server;
distribute a request issued from the first standby-system virtual device of the first virtual server to the first standby-system physical device configured as a physical device which is used at a high priority by the first standby-system virtual device of the first virtual server; and distribute a request issued from another standby-system virtual device of another virtual server to another standby-system physical device which has not been configured as a physical device which is used at a high priority by any of the standby-system virtual devices of the plurality of virtual servers when the another standby-system physical device exists.

2. The computer system according to claim 1,
wherein, when the another standby-system physical device which has not been configured as a physical device which is used at a high priority by any of the standby-system virtual devices of the plurality of virtual servers does not exist, the virtualization mechanism is configured to distribute the request issued from the another standby-system virtual device of the another virtual server to a standby-system physical device which is configured as a physical device which is used at a high priority by any of the standby-system virtual devices of the plurality of virtual servers.

3. The computer system according to claim 1, further comprising a management server configured to manage the at least one physical server,
wherein, when the request is issued from the another standby-system virtual device of the another virtual server and the another standby-system physical device which has not been configured as a physical device which is used at a high priority by any of the standby-system virtual devices of the plurality of virtual servers does not exist, the virtualization mechanism is configured to issue an inquiry to the management server to determine a standby-system physical device to distribute the request,
wherein the management server is configured to:
determine the standby-system physical device to distribute the request on a basis of priority rankings of tasks executed by each of the of virtual servers; and
notify the virtualization mechanism of the determination result, and
wherein, on the basis of the determination result of the management server, the virtualization mechanism is configured to distribute the request to a standby-system physical device which is configured as a physical device which is used at a high priority by any of the standby-system virtual devices of the plurality of virtual servers.

4. The computer system according to claim 3,
wherein, when the request is issued from the another standby-system virtual device of the another virtual server, if the another standby-system physical device which has not been configured as a physical device which is used at a high priority by any of the standby-system virtual devices of the plurality of virtual servers does not exist and when there is a standby-system physical device which is capable of being assigned the request and is configured as a physical device which is used at a high priority by any of the standby-system virtual devices of the plurality of virtual servers, the virtualization mechanism is configured to distribute the request to the standby-system physical device which is capable of being assigned the request and,
when the standby-system physical device which is capable of being assigned the request does not exist, the virtualization mechanism is configured to issue the inquiry to the management server to determine a standby-system physical device to be distributed the request.

5. The computer system according to claim 1, further comprising a management server configured to manage the at least one physical server and a storage apparatus for providing a storage area for reading and writing data from the at least one physical server,
wherein the current-system physical devices and standby-system physical devices are adapters for performing communications with the management server or the storage apparatus.

6. The computer system according to claim 1,
wherein the virtualization mechanism is configured to determine whether the fault has occurred in the first current-system physical device allocated to the first current-system virtual device of the first virtual server based on a request type issued by the first standby-system virtual device of the first virtual server.

7. The computer system according to claim 6,
wherein, when the request issued from the first standby-system virtual device of the first virtual server is a vital monitoring request or when a packet size of the request issued from the first standby-system virtual device is less than a threshold, the virtualization mechanism is configured to determine that the fault has occurred in the first current-system physical device allocated to the first current-system virtual device of the first virtual server.

8. The computer system according to claim 7,
wherein, when the request issued from the another standby-system virtual device of the another virtual server is a vital monitoring request and the another standby-system physical device which has not been configured as a physical device which is used at a high priority by any of the standby-system virtual devices of the plurality of virtual servers exists, the virtualization mechanism is configured to distribute the request to the another standby-system physical device, and
wherein, when the another standby-system physical device which has not been configured as a physical device which is used at a high priority by any of the standby-system virtual devices of the plurality of virtual servers does not exist, the virtualization mechanism is configured to distribute the request to a standby-system physical device which is configured as a physical device which is used at a high priority by any of the standby-system virtual devices of the plurality of virtual servers executing a task with a lowest priority ranking, or to a standby-system physical device with a lowest load.

9. An availability method for a computer system comprising at least one physical server,
wherein the at least one physical server comprises:
current-system physical devices;
standby-system physical devices; and
a virtualization mechanism which provides a plurality of virtual servers each comprising a current-system virtual device obtained by virtualizing the current-system physical devices, and a standby-system virtual device obtained by virtualizing the standby-system physical devices,
the availability method comprising:
a first step in which the virtualization mechanism allocates, for occupied usage, the current-system physical devices to the current-system virtual devices of each of the plurality of virtual servers and which allocates, for shared usage, the standby-system physical devices to the standby-system virtual devices of the virtual servers; and
a second step in which, when a fault occurs in a first current-system physical device allocated to a first current-system virtual device of a first virtual server, the virtualization mechanism configures a first standby-system physical device, which has not been configured as a physical device which is used at high priority by any of the standby-system virtual devices of the plurality of virtual servers, as a physical device which is used at a high priority by a first standby-system virtual device of the first virtual server;

distributes a request issued from the first standby-system virtual device of the first virtual server to the first standby-system physical device configured as a physical device which is used at a high priority by the first standby-system virtual device of the first virtual server; and distributes a request issued from another standby-system virtual device of another virtual server to another standby-system physical device which has not been configured as a physical device which is used at a high priority by any of the standby-system virtual devices of the plurality of virtual servers when the another standby-system physical device exists.

10. The availability method for a computer system according to claim 9, wherein, in the second step, when the another standby-system physical device which has not been configured as a physical device which is used at a high priority by any of the standby-system virtual devices of the plurality of virtual servers does not exist, the virtualization mechanism distributes the request issued from the another standby-system virtual device of the another virtual server to a standby-system physical device which is configured as a physical device which is used at a high priority by any of the standby-system virtual devices of the plurality of virtual servers.

11. The availability method for a computer system according to claim 9, wherein the computer system further comprises:

a management server configured to manage the physical servers, and wherein the second step comprises:

an inquiry step in which, when the request is issued from the another standby-system virtual device of the another virtual server and the another standby-system physical device which has not been configured as a physical device which is used at a high priority by any of the standby-system virtual devices of the plurality of virtual servers does not exist, the virtualization mechanism issues an inquiry to the management server to determine a standby-system physical device to distribute the request;

a determination step in which the management server determines the standby-system physical device to distribute the request on a basis of priority rankings of tasks executed by each of the plurality of virtual servers, and notifies the virtualization mechanism of the determination result; and a distribution step in which, on the basis of the determination result of the management server, the virtualization mechanism distributes the request to a standby-system physical device which is configured as a physical device which is used at a high priority by any of the standby-system virtual devices of the plurality of virtual servers.

12. The availability method for a computer system according to claim 11, wherein, in the inquiry step, when the request is issued from the another standby-system virtual device of the another virtual server, if the another standby-system physical device which has not been configured as a physical device which is used at a high priority by any of the standby-system virtual devices of the plurality of virtual servers does not exist and when there is a standby-system physical device which is capable of being assigned the request and is configured as a physical device which is used at a high priority by any of the standby-system virtual device of the plurality of virtual servers, the virtualization mechanism distributes the request to the standby-system physical device which is capable of being assigned the request and, when the standby-system physical device which is capable of being assigned the request does not exist, the virtualization mechanism issues an inquiry to the management server to determine a standby-system physical device to distribute the request.

13. The availability method of the computer system according to claim 9, wherein the computer system further comprises a management server configured to manage the physical server and a storage apparatus for providing a storage area for reading and writing data from the at least one physical server, wherein the current-system physical devices and standby-system physical devices are adapters for performing communications with the management server or the storage apparatus.

14. The availability method of the computer system according to claim 9, wherein, in the second step, the virtualization mechanism determines whether the fault has occurred in the first current-system physical device allocated to the first current-system virtual device of the first virtual server based on a request type issued by the first standby-system virtual device of the first virtual server.

15. The availability method of the computer system according to claim 14, wherein, in the second step, the virtualization mechanism determines whether the fault has occurred in the first current-system physical device allocated to the first current-system virtual device of the first virtual server when the request issued from the first standby-system virtual device of the first virtual server is a vital monitoring request or when a packet size of the request issued from the first standby-system virtual device is less than a threshold.

16. The availability method of the computer system according to claim 15, wherein, in the second step, when the request issued from the another standby-system virtual device of the another virtual server is a vital monitoring request, the virtualization mechanism distributes the request to the another standby-system physical device when the another standby-system physical device which has not been configured as a physical device for high priority usage by any of the standby-system virtual devices of the plurality of virtual servers exists, and when the another standby-system physical device which has not been configured as a physical device for high priority usage by any of the standby-system virtual devices of the plurality of virtual servers does not exist, the virtualization mechanism distributes the request to a standby-system physical device configured as a physical device for high priority usage by any of the standby-system virtual devices of the plurality of virtual servers which executes a task with a lowest priority ranking, or to a standby-system physical device with a lowest load.

* * * * *